(12) United States Patent
Lynch

(10) Patent No.: US 12,269,748 B2
(45) Date of Patent: Apr. 8, 2025

(54) METHODS FOR PRODUCING AND PRODUCTS INCLUDING HOLLOW SILICA OR HOLLOW GLASS SPHERES

(71) Applicant: Plassein Technologies Ltd. LLC, Las Vegas, NV (US)

(72) Inventor: David Charles Lynch, Kingsport, TN (US)

( * ) Notice: Subject to any disclaimer, the term of this patent is extended or adjusted under 35 U.S.C. 154(b) by 815 days.

(21) Appl. No.: 17/468,138

(22) Filed: Sep. 7, 2021

(65) Prior Publication Data
US 2022/0212939 A1 Jul. 7, 2022

Related U.S. Application Data

(60) Provisional application No. 63/074,667, filed on Sep. 4, 2020.

(51) Int. Cl.
*C01B 33/18* (2006.01)
*B01J 13/02* (2006.01)

(52) U.S. Cl.
CPC .............. *C01B 33/18* (2013.01); *B01J 13/02* (2013.01)

(58) Field of Classification Search
None
See application file for complete search history.

(56) References Cited

U.S. PATENT DOCUMENTS

| 3,427,139 A | 2/1969 | Gregory |
| 3,528,809 A * | 9/1970 | Redmond ................. B01J 2/00 419/36 |
| 10,494,555 B1 | 12/2019 | Goswami et al. |
| 2012/0321897 A1 | 12/2012 | Yang et al. |
| 2014/0371116 A1 * | 12/2014 | Hojaji .................. C03B 5/005 523/219 |
| 2018/0044186 A1 * | 2/2018 | Lynch .................. C01B 32/956 |

FOREIGN PATENT DOCUMENTS

WO WO 2008/087047 A1 7/2008

OTHER PUBLICATIONS

PCT Application No. PCT/US2021/49290, International Search Report and Written Opinion dated Feb. 4, 2022.

* cited by examiner

*Primary Examiner* — Michael Forrest
(74) *Attorney, Agent, or Firm* — Larry E. Henneman, Jr.; Henneman & Associates, PLC

(57) ABSTRACT

Methods for producing a hollow spheres, optionally with a vacuum inside, are disclosed. An example method includes providing a seed with a core and a coating. The seed is heated to a temperature sufficient to transform the coating into a continuous shell having an interior and an exterior. The shell isolates the core from the exterior of the shell. The temperature is also sufficient to cause a reaction with the materials of the core, and the reaction converts the core to a gas within said shell. Controlling the rate of heating and the pressure surrounding the shell allows the shell to expand responsive to gas pressure within the shell. Cooling the shell causes the gases within the shell to revert to a solid form, thereby creating a vacuum within the shell. Products incorporating the hollow spheres are also disclosed.

15 Claims, 16 Drawing Sheets

METHODS FOR PRODUCING AND PRODUCTS INCLUDING HOLLOW SILICA OR HOLLOW GLASS SPHERES

RELATED APPLICATIONS

This application claims the benefit of co-pending U.S. Provisional patent Application No. 63/074,667, filed Sep. 4, 2020 and having the same inventor, which is incorporated herein by reference in its entirety.

BACKGROUND OF THE INVENTION

Field of the Invention

The present invention relates generally to methods for producing hollow spheres and, more specifically, to methods for producing hollow spheres in different physical forms. The present invention additionally relates to products including hollow spheres and methods for producing those products.

Description of the Background Art

Hollow spheres have largely been limited as a filler material that reduces the density of organic compounds as a composite. Organic and glass hollow spheres have found use in polymeric compounds as early as the mid-1960s. Initially glass microspheres were not strong enough to survive the high shear forces and high pressures involved in plastics compounding and injection molding. 3M introduced a glass microsphere in the late 80s with enough strength for use as a filler in many high-shear processes.

Cenospheres have, also, found use in organic compounds. They are hollow glass microspheres that are a by-product of coal burning power plants. The composition of a cenosphere is a function of the composition of the coal burned. Cenospheres typically contain more than 50 weight percent (wt %) silica ($SiO_2$), 22 to 34 wt % alumina ($Al_2O_3$), 3 to 5 wt % basic oxides (consisting of CaO, MgO, $K_2O$, $TiO_2$, and iron oxides), and small concentrations of other heavy metals. The viscosity and composition of the glass that forms the wall of a cenosphere limits their use at elevated temperatures. At high temperatures their low viscosity will lead to their collapse, and the presence of heavy metals poses both environmental and physical problems. The transfer of impurity atoms from cenospheres to a matrix material can impact the latter's properties such as strength and toughness.

A method for producing hollow silica microspheres (HSMS) is presented in U.S. patent application Publication No. 2018/0044186 A1, which is by the same inventor as the present application. In that patent application silicon carbide (SiC) or elemental silicon (Si) is coated with sufficient silica to produce both the wall of the hollow sphere and serve as a chemical reactant that participates in the generation of gas that leads to the creation and expansion of the hollow sphere.

Color and/or the viscosity of glass are factors that contribute to the inventions presented in the next section. Fortunately, there are extensive databases for both properties. The use of pigments in producing color extends to prehistoric times. From the year 1400 to the current time, processes for producing color using pigments and dyes have been recorded in the written record. That includes the use of pigments added to glass to create color. The viscosity of a glass is often characterized by its softening and working point temperatures as presented by Doremus in his book entitled Glass Science. Schott, Corning, and other glass producers have extensive data bases for the physical properties of different glass compositions, including color, durability, and viscosity data.

SUMMARY

The present invention overcomes problems associated with the prior art by providing various methods for producing hollow spheres and improved products including such hollow spheres.

Example methods for producing hollow spheres are disclosed. One example method for producing a hollow sphere with a vacuum inside includes providing a seed, heating the seed to form a hollow sphere. The seed includes a core and a coating outside the core. The core includes a mixture of two or more compounds. The seed is heated to a temperature sufficient to transform the coating into a continuous shell having an interior and an exterior, and the continuous shell isolates the core from the exterior of the shell. The temperature is also sufficient to cause a reaction between the two or more compounds of the core, and the reaction between the two or more compounds converts the core to a gas within the shell. The rate of heating and a pressure surrounding the exterior of the shell are controlled to allow the shell to expand responsive to a pressure of the gas within the shell. The example method additionally includes continuing to heat the seed until the reaction ceases to produce the gas, and cooling the shell to a second temperature at which the shell becomes rigid. The example method further includes continue cooling the shell until the gases within the shell react with one another to revert to a solid form, thereby creating a vacuum within the rigid shell.

In an example method, the core can include at least one reducing agent in addition to the two or more compounds. The coating can include silica, glass frit, or any other material that forms a viscous material and flows as pressure increases at the interface between the core and the coating.

In example methods, the step of heating the seed can include heating the seed in conjunction with a plurality of similar seeds. In one example method, the step of heating the seeds can include heating the seed and the plurality of additional seeds with a plasma torch.

In another example method, the step of heating the seeds can include placing the plurality of seeds in a confined space in contact with one another. The confined space can restrict expansion of the shells along at least one direction and allow expansion of the shells along another direction different than the at least one direction. Then, the plurality of seeds can be heated within the confined space.

In another example method, the step of heating the seeds can include placing the seeds in contact with previously formed hollow spheres and heating the seeds to transform the seeds into new hollow spheres in contact with the previously formed hollow spheres. The step of heating the seeds can include restricting the heat source to predominantly heat the seeds and allowing the seeds to expand unrestricted.

In yet another example method, the step of heating the seeds can include depositing the seeds in layers on top of underlying layers of hollow spheres and heating the layers of seeds without altering the underlying layers of hollow spheres.

Optionally, the step of providing the seed can include providing the seed with an additive to alter a physical property of the resulting hollow sphere. For example, the step of providing the seed with an additive can include disposing the additive on an external surface of the coating.

As another example, the step of providing the seed with an additive can include dispersing the additive within the coating. As another example, the step of providing the seed with an additive can include providing a layer of inert material between the core and the coating. As yet another example, the step of providing the seed with an additive can include mixing an inert material with the two or more compounds of the core. Any or all of these examples can be used alone or in any combination with one another.

Articles of manufacture are also disclosed. In general, an article of manufacture can include a base material and a plurality hollow spheres coupled with the base material. In one example, the base material can be paint, and the plurality of hollow spheres can be dispersed in the paint and can include color centers within walls of the hollow spheres. In addition, the walls of the hollow spheres can additionally or alternatively include a light-blocking layer.

In another example article of manufacture, the base material can be a metal, and the hollow spheres can include color centers. The metal and the hollow spheres can, together, form a composite material that has a color corresponding to the color centers.

In yet another example article of manufacture, the hollow spheres are capable of absorbing radar. For example, the hollow spheres can include elemental iron in the walls of the hollow spheres. Additionally (or alternatively), the hollow spheres can include silicon carbide dust within interiors of the hollow spheres. In another example article of manufacture, the hollow spheres can include a material that absorbs ultraviolet light.

In another example article of manufacture, the base material can a filter media, and the hollow spheres can include elemental copper on the surfaces thereof.

In another example article of manufacture, the base material is concrete, and the hollow spheres are mixed in the concrete. In another example article of manufacture, the base material is a ferrocement, and the hollow spheres are mixed in the ferrocement. In yet another example article of manufacture, the article of manufacture is a fiber cement construction material, and the hollow spheres are embedded in the fiber cement construction material. In yet another example article of manufacture, the article of manufacture is a fired clay roof tile, and the hollow spheres are embedded in the fired clay roof tile. In another example article of manufacture, the article of manufacture is drywall, and the hollow spheres are embedded in the drywall. In another example article of manufacture, the base material is a metal, and the hollow spheres form a composite with the metal. In the example composite, the hollow spheres can occupy at least half of a volume of the composite.

Another example article of manufacture additionally includes a second base material. The second base material can have a different coefficient of thermal expansion than the base material. The hollow spheres can be included in a graded interface between the base material and the second base material.

Example seeds for producing hollow spheres are also disclosed. An example seed includes a core and a coating. The core can include at least two compounds that, when heated, react to produce a gas. The coating surrounds the core and can include at least one of silica, glass, or a material that becomes a glass upon heating. The core can include compacted powders of the at least two compounds.

Example seeds can additionally include an additive selected to alter a physical characteristic of a hollow sphere formed from the seed. In one example seed, the additive can be disposed on an outer surface of the coating. In another example seed, the additive can be dispersed throughout the coating. In another example seed, the additive can be disposed between an outer surface of the core and an inner surface of the coating. In yet another example seed, the additive can dispersed throughout the core. The additive can be an inert material that retains its initial composition throughout production of the hollow sphere.

In an example seed, a rate of the production of the gas by the core is temperature dependent. The viscosity of the coating is also temperature dependent. At a particular temperature the viscosity of the coating is sufficient to facilitate expansion of the coating to accommodate the production of the gas at the particular temperature.

Another example seed includes a core, a coating, and an additive. The core produces a gas when heated. The coating surrounds the core and can include at least one of silica, glass, or a material that becomes a glass upon heating. The additive can be selectively positioned with respect to the core and the coating to produce a predetermined characteristic of a hollow sphere produced from said seed. The additive can be reactive or inert. Optionally, the seed can include at least one other additive selectively positioned with respect to the core and the coating to produce a second predetermined characteristic of the hollow sphere produced from the seed.

BRIEF DESCRIPTION OF THE DRAWINGS

The present invention is described with reference to the following drawings, wherein like reference numbers denote substantially similar elements.

DETAILED DESCRIPTION

Figure 1A:
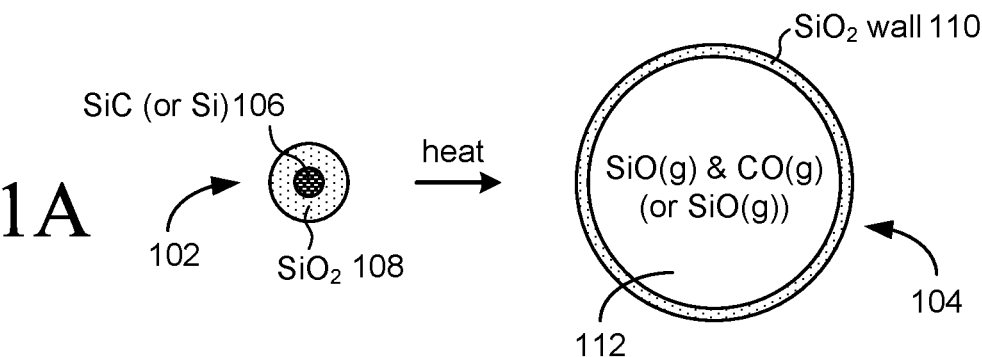
FIG. 1A illustrates the transformation of a seed to a hollow sphere.

The following U.S. patent applications by the same inventor include disclosures related to hollow spheres:

U.S. patent application Ser. No. 15/399,592, filed Jan. 5, 2017;

U.S. Provisional Patent Application No. 62/390,884, filed Apr. 13, 2016; and

U.S. patent application Ser. No. 17/002,645, filed Aug. 25, 2020.

All of these prior applications are incorporated herein by reference in their respective entireties. The present application discloses many features that can be combined with features disclosed these prior applications. All such combinations are considered to be inventions within the scope of this application. By way of non-limiting example, this application includes:

Procedures for forming seeds, the precursor to the hollow sphere;

New formulations for seeds that are transformed into hollow spheres;

Methods for reducing production temperature for converting a seed to a hollow sphere, thereby reducing energy requirements, cost, and carbon emissions;

Processes for converting seeds to individual hollow spheres;

Process for producing layered sheets of hollow spheres with three-dimensional stability, and with continuous porosity that can be infused with other materials including, but not limited to, molten or powdered metals, polymers, cement, gases, gypsum, and other ceramic slurries;

Process for producing bulk forms of hollow structures with little or no open porosity; and Example uses of hollow spheres.

DEFINITIONS

Additive—An element, or compound, or ion that interacts with the components in a seed during converting a seed to a hollow sphere. As a non-limiting example, the additive can coat the exterior surface of a seed or be included in its coating. The additive can be chemically reactive or inert.

Coating—The material surrounding the core of a seed, which can include silica, or glass frit, or any other material that during conversion of a seed to a hollow sphere forms a viscous material that flows as pressure increases at the interface between the core and its coating.

Color Center—An element, or compound, or ion that reflects a portion of visible light and absorbs another different portion of the visible light.

Core—The phase in the center of the seed that produces gas either by reaction with the coating or by reaction with different materials in the core.

Glass—A viscous liquid.

Glass Frit—Ground glass powder or mixture of powders that form glass upon fusion.

HSMS—hollow silica microspheres.

Inert—Inert is any material that does not, or only slightly, reacts with materials in a seed upon converting the seed to a hollow sphere.

Mix-core—A core consisting of a mixture of SiC and $SiO_2$, or Si and $SiO_2$ or any mixture of materials that produce a gas upon heating.

Mix-Seed—A seed with a mix-core.

Mixture—refers to a combination of powders, for example SiC and $SiO_2$ or Si and $SiO_2$, that upon heating produce gas used to create hollow spheres.

Seed—A coated core.

Si-Seed—A seed with a core that produces gas through chemical reaction between Si and $SiO_2$.

SiC-Seed—A seed with a core that produces gas through chemical reaction between SiC and $SiO_2$.

SiCmix-Seed—A seed with a core consisting of a mixture of SiC and $SiO_2$

Simix-Seed—A seed with a core consisting of a mixture of Si and $SiO_2$.

Silica—Is used to represent both amorphous $SiO_2$ (often refereed to fused silica), and crystalline $SiO_2$ (usually known as quartz).

In the following description, numerous specific details are set forth (e.g., specific core compositions, specific coating compositions, specific additives, specific products including hollow spheres, specific methods/equipment for producing hollow spheres, and so on) in order to provide a thorough understanding of the invention. Those skilled in the art will recognize, however, that the invention may be practiced apart from these specific details. In other instances, details of well-known chemical engineering practices (e.g., routine processes, control of temperature and pressure, material transfer, and so on) and components (reaction chambers, transfer equipment, heat sources, pumps, and so on) have been omitted, so as not to unnecessarily obscure the present invention.

Material modifications can be used to alter the physico-chemical properties of a hollow sphere with respect to the needs for specific uses in existing and new applications. Material modifications can also be used to reduce the temperature, cost, and carbon emissions in production of hollow spheres.

Core, Coatings and Seeds

FIG. 1A shows a seed 102 and a resulting hollow sphere 104. Seed 102 includes a core 106 and a coating 108. Hollow sphere 104 includes a wall 110 defining an interior space 112.

Figure 1B:
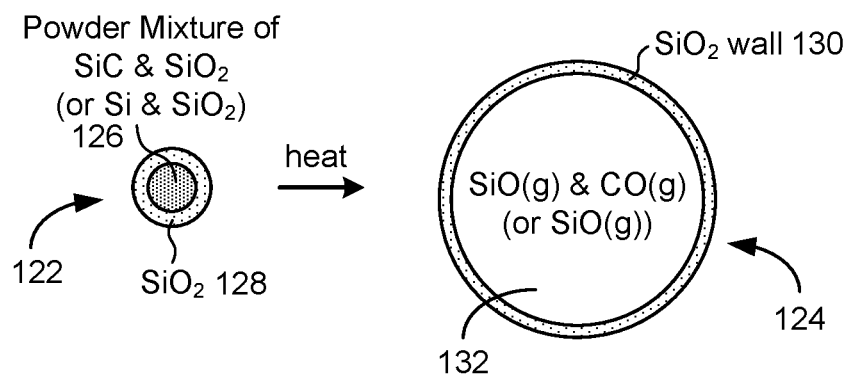
FIG. 1B illustrates a seed with a mixture of reactants in its core being transformed into a hollow sphere.

FIG. 1B shows a seed 122 and a resulting hollow sphere 124. Seed 122 includes a core 126 and a coating 128. Hollow sphere 124 includes a wall 130 defining an interior space 132.

Figure 1C:
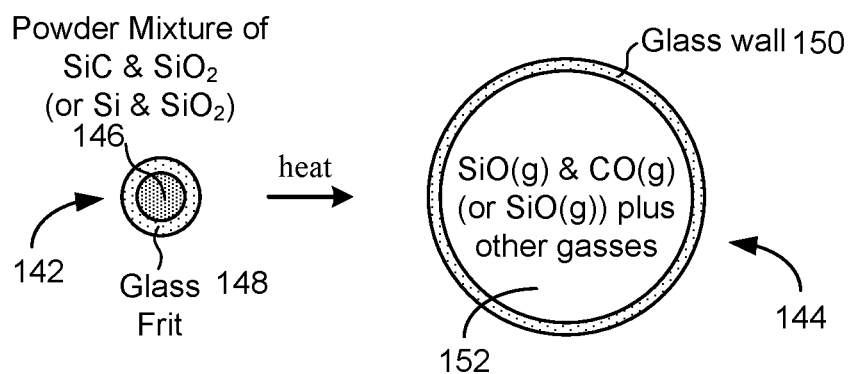
FIG. 1C illustrates a seed with a mixture of reactants in its core and a glass frit coating being transformed into a hollow sphere.

FIG. 1C shows a seed 142 and a resulting hollow sphere 144. Seed 142 includes a core 146 and a coating 148. Hollow sphere 144 includes a wall 150 defining an interior space 152.

In a prior patent application, a silicon carbide (SiC) or a silicon (Si) core is coated with silica ($SiO_2$) prior to heating as represented by the drawing in FIG. 1A. In FIGS. 1B and 1C the core consists of a mixture of SiC and $SiO_2$, or Si and $SiO_2$ coated with silica or a glass frit. These coated cores of SiC, and a mixture of SiC and $SiO_2$ will, from this point forward, be referred to as a SiC-Seed and SiCmix-Seed, respectively. Coated cores consisting of Si, and a mixture of Si and $SiO_2$ will be referred to as a Si-Seed and as a Simix-Seed, respectively. Use of the word "seed" applies to all forms of seeds. The pictured representations of the seeds in the figures in this document are shown as spheres. That representation was selected for convenience, but a seed can have any shape.

SiC-Seeds and Si-Seeds react with the material surrounding the core to produce a gas, whereas the seeds with the mixtures generate the gas within the core. Heating the seeds produces gas through the chemical reactions:

SiC-Seed & SiCmix-Seed

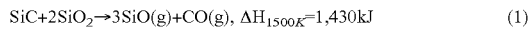
$$SiC + 2SiO_2 \rightarrow 3SiO(g) + CO(g), \Delta H_{1500K} = 1,430 kJ \quad (1)$$

Si-Seed & Simix-Seed

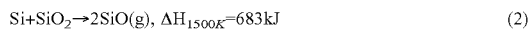
$$Si + SiO_2 \rightarrow 2SiO(g), \Delta H_{1500K} = 683 kJ \quad (2)$$

The mix-Seeds have the advantage of faster rates of reaction as a result of the increased contact of solid reactants in reactions 1 and 2. The mix-Seeds coated with glass frit will experience less chemical interaction between the fused frit (glass) and the gases generated by reactions 1 and 2 as compared to using a non-mixed seed. That reduction in interaction is due to the fact that silica in the glass is not being consumed by reactions 1 and 2, and thus not producing a porous structure exposing other potentially reactive constituent oxides in the glass that would undergo reduction by chemical reaction with either SiO(g) or CO(g).

The cores, whether they are mix-cores or not, but are formed from powders, can be produced by pressure compacting, by isostatic pressing, by non-isostatic pressing, by sintering, by 3-dimensional printing, and by use of an adhesive compound. The strength of the core can be increased by sintering at an elevated temperature in the presence of an inert environment. A SiC or Si core can be oxidized to produce a silica coating as presented in U.S. 2018/0044186 A1.

Additional reducing agents can be added to the core to improve transformation to a hollow sphere. For example, one or more reducing agents can initiate the reaction in the core or the reaction between the core and the coating to produce gas that begins the transformation of the seed to a hollow sphere. As another example, adding one or more reducing agents can ensure that there is adequate reductant to react with an oxidizer that contacts the core after being transported by diffusion from the surroundings through the coating material.

The coating of the core of a seed can be accomplished in any manner that covers all, or nearly all, of the exterior surface of the core material (SiC or Si, or mix-cores), and such that the coating has sufficient physical strength so as to be retained during handling and during the transformation from seed to hollow sphere. An adhesive or any other material or process that creates a layer of the desired coating around the core is acceptable, provided a hollow sphere can be produced from the seed.

In some alternate processes, the coating layer need not initially be silica or glass frit, but a material will transform to a fused substance that will expand as gas is formed in the interior of the seed.

Heating the Seed and Growing the Hollow Sphere

At this point it is assumed for sake of clear explanation, but not necessarily required, that there is a silica coating the core. In general, what is described here applies to any material coating a core, provided it can isolate the core from the external environment, and can respond to an increase in internal pressure by expanding while forming the wall of a hollow sphere.

Upon heating a seed with a silica coat, the core of the seed becomes isolated from the surroundings as the silica coating the core forms a continuous fused structure with minimal porosity. With SiC Seeds and SiCmix Seeds (or Si Seeds and Simix Seeds) the production of the gas by reaction 1 (or reaction 2) continues until all the SiC (or Si) is consumed, or application of external pressure places reaction 1 (or reaction 2) in an equilibrium state, thereby preventing any additional gas formation. A hollow sphere forms, provided the viscosity of the silica surrounding the inner core of the seed is low enough that it can flow and respond to the internal pressure created by chemical reaction 1 (or reaction 2). The plotted data in FIG. 2 suggests that the SiC and SiCmix cores coated with silica may require heating to a temperature greater than 1900° C. (2173K), and for Si and Simix cores, also coated in silica, to a temperature possibly higher than 2000° C. (2273K). The appropriate selection of temperature for converting a seed to a hollow sphere depends on the pressure differential (internal minus external). Lower temperatures can be used to convert seed to hollow sphere provided the pressure differential is small. That situation also manifests itself as a slow transformation rate of seed to hollow sphere.

Figure 2B:
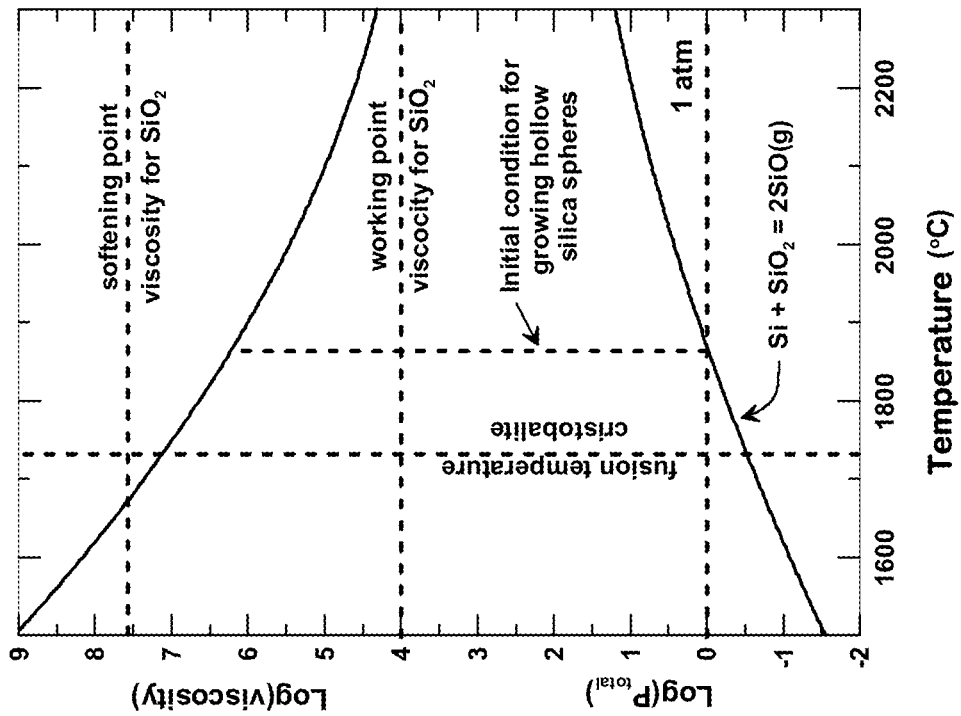
FIG. 2B is graph linking the viscosity of silica to a pressure (in atmospheres) of a gas created by reactions (1) and (2) in cores of Si and Simix.
Figure 2A:
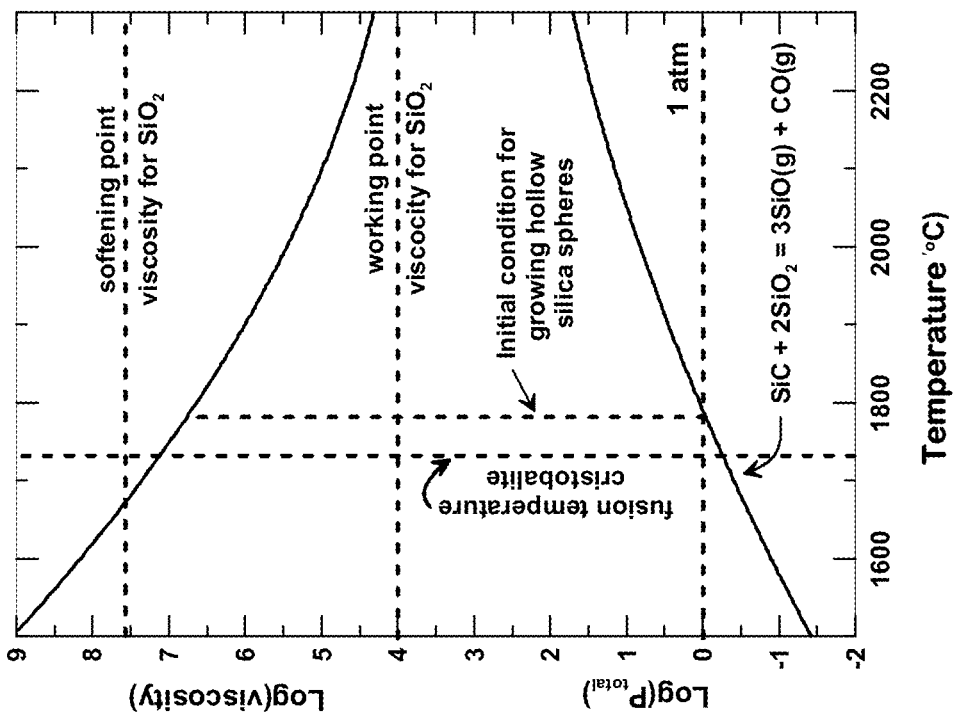
FIG. 2A is graph linking the viscosity of silica to a pressure (in atmospheres) of a gas created by reactions (1) and (2) in cores of SiC and SiCmix.

The graphs of FIG. 2A and FIG. 2B link the viscosity of silica to the pressure of the gas in atmospheres created by reactions 1 and 2. FIG. 2A applies to cores of SiC and SiCmix, and FIG. 2B applies to cores of Si and Simix. The initial condition for growing hollow spheres as identified in each graph assumes, by way of non-limiting example, 1 atmosphere external pressure.

Figure 3:
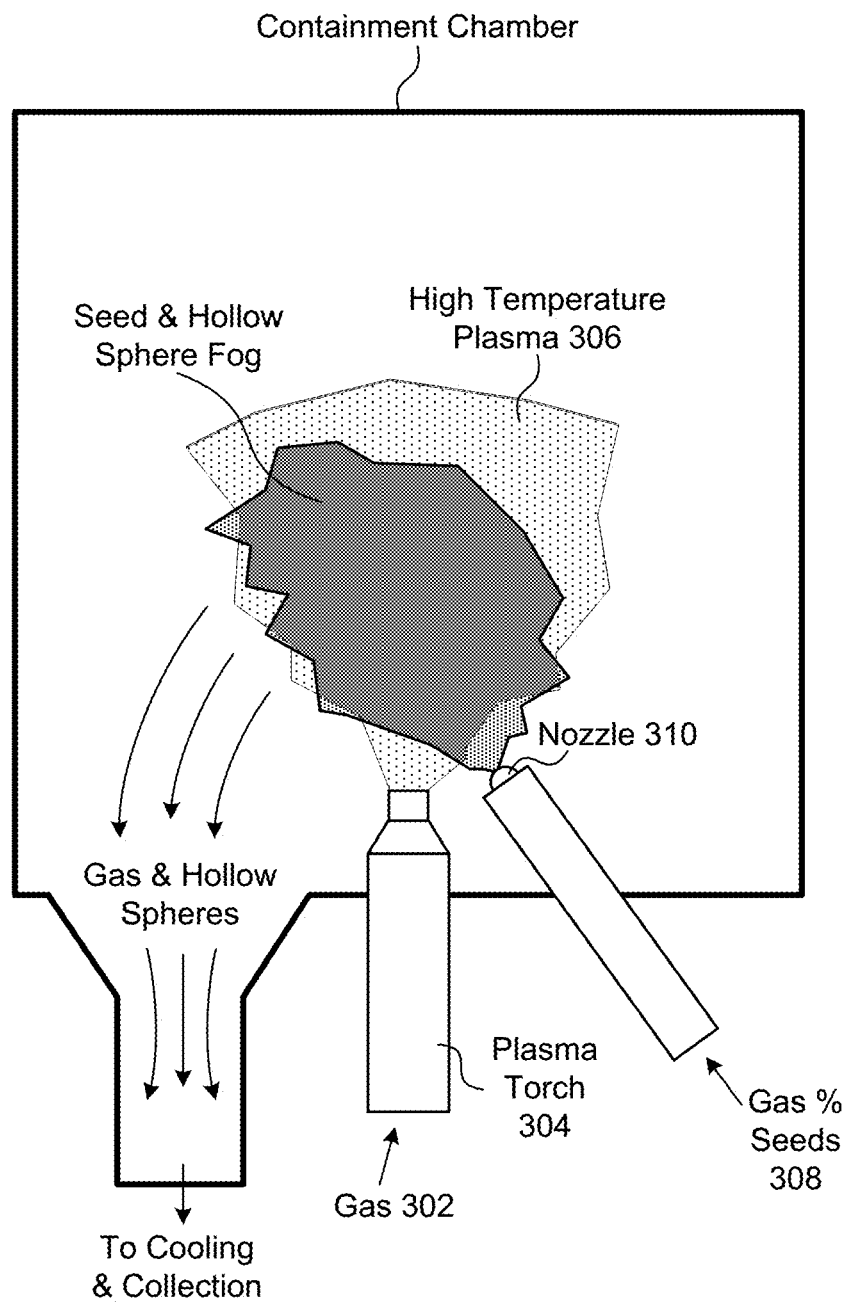
FIG. 3 shows an apparatus for converting individual seeds to hollow spheres using a plasma torch.

In converting a seed to a hollow sphere, the heating rate and viscosity of the silica layer are linked. The graph, FIG. 2A, for heating SiC and SiCmix cores coated in silica, combines the viscosity data for the silica layer (the upper curve) with the pressure produced by reaction 1 (the lower curve). A similar set of curves are presented in FIG. 2B for Si and Simix cores coated in silica. At this point the discussion is focused on the SiC and SiCmix cores, however the general aspects of the discussion also apply to Si and Simix cores. A fast heating rate, such as that achieved with, by way of non-limiting example, a plasma torch, can be employed in converting a seed to a hollow sphere at ambient pressure. Heat transfer coefficients have very high vales for particles in a turbulent environment created with a plasma torch. The exterior surface of seeds injected into a plasma as shown in FIG. 3 quickly attain a temperature that lowers the viscosity of the silica to an acceptable level before the core of the seed reaches a temperature that produce a gas pressure that can rupture the silica layer. The endothermic nature of reactions 1 and 2, as quantified by the heats of reaction included with the chemical reaction equations, reduces the temperature of the core during reaction while the exterior surface of the seed is heated.

If heating a seed with a silica coating is conducted slowly, the silica layer will likely rupture before its viscosity is low enough for it to flow in response to the internal pressure. Heating slowly without a rupture can be achieved by increasing the pressure surrounding seeds while increasing temperature. The temperature-pressure-viscosity relationship is presented in FIG. 2A for SiC-Seeds and FIG. 2B for Si-Seeds. On either graph a vertical line establishes the temperature and dictates both the pressure generated by either reaction 1 or 2 and the viscosity of the silica layer at that temperature. If the viscosity is not low enough at a specific temperature the pressure in the reactor can be increased to a value greater than the pressure created by the chemical reaction to keep the silica shell from rupturing. Once there is sufficient heating of the seeds, such that the viscosity of silica is low enough for it to flow as the volume of the gas created by reactions 1 or 2 increases, the pressure in the reactor can be decreased to grow the hollow spheres, or the external pressure can remain constant while increasing temperature to grow the hollow spheres.

Heating a seed in the presence of an oxidizing gas at ambient pressure can reduce the impact of ruptures of the silica layer as described in the previous paragraph. When a rupture occurs during heating the gas generated by reaction 1 or 2 escapes, allowing the oxidizing atmosphere to enter the once isolated chamber where it contacts the core consisting of, or containing, SiC or Si. That contact produces, by chemical reaction, a silica layer that will isolate the SiC or Si in the core from the oxidizing atmosphere. At that point reaction 1 or 2 begins to generate gas, and if the viscosity of the new silica layer is low enough the layer begins to expand and will upon further expansion seal the hole created by the rupture. This process can be repeated until the silica layer can flow in response to the internal pressure.

TABLE 1

Comparison of critical temperature for various glasses, including fused silica.

| Material | Annealing Temp. (° C.) | Softening Temp. (° C.) | Working Temp. (° C.) |
|---|---|---|---|
| Fused Silica | 1150 | 1675 | 2360 |
| Aluminosilicat (EZ-1) | 720 | 920 | 1200 |
| Borosilicate (KG-33) | 550 | 815 | 1220 |
| Soda-Lime (R-6) | 520 | 690 | 970 |
| Alkali-Lead (KG-1) | 430 | 620 | 970 |

A glass frit can replace the silica coating as presented in FIG. 1C. Glass compositions are usually rich in silica and contain some basic or amphoteric compounds that reduce the annealing, softening, and working temperatures with respect to pure silica. Examples are presented in Table 1. These are but a few examples. Companies like Corning Glass, Schott, and other glass companies have compiled data on the physico-chemical characteristics of numerous glass compositions. That data can be used to match a glass temperature-viscosity relationship with the temperature-pressure connection associated with either chemical reaction 1 or 2 (following the example presented in FIG. 2). With that information a reactor can be designed, and operational parameters established. Use of a glass frit to coat the core of a seed reduces the temperature required to convert a seed to a hollow sphere, and it is possible to produce spheres without pressurizing a reactor. Additional advantages are reduced production costs and reduced carbon emissions as less energy is required. The disadvantage of using a glass frit is that the maximum use temperature of a hollow sphere will be lower than one produced with silica.

Methods for Mass Production of Hollow Spheres from Seeds

Three methods are presented for mass production of hollow spheres. These example methods begin with seeds and are focused on the conversion of the seeds to hollow spheres. The methods presented are but a few examples and should not be viewed as all encompassing.

Alternative methods may include different heat sources, pressure regulation, and even a combination of including the growth of the hollow sphere with seed production.

Example 1: The Plasma Torch

A non-transferred arc plasma torch can provide the thermal energy for both the chemical reaction (1 or 2) and the sensible heat to raise the seed to the required temperature. One possible arrangement is presented in FIG. 3. A gas 302 (inert, or oxidizing, or specialty gas) is passed through the plasma torch 304 producing a large and high temperature plasma plume 306 of swirling superheated ionized gaseous atoms. The rapid mixing occurring in the plasma reduces the need to operate the plasma torch at pressures greater than 1 atmosphere as explained earlier.

Elutriation is used to inject seeds 308 into the plasma 306 through a nozzle 310. The gas used to elutriate the seeds reduces the temperature of the plume to that required to achieve the desired viscosity of the silica (or glass) to initiate the growth of the hollow spheres from their seeds.

Example 2: Bulk Heating with Constrained Expansion

Figure 4:
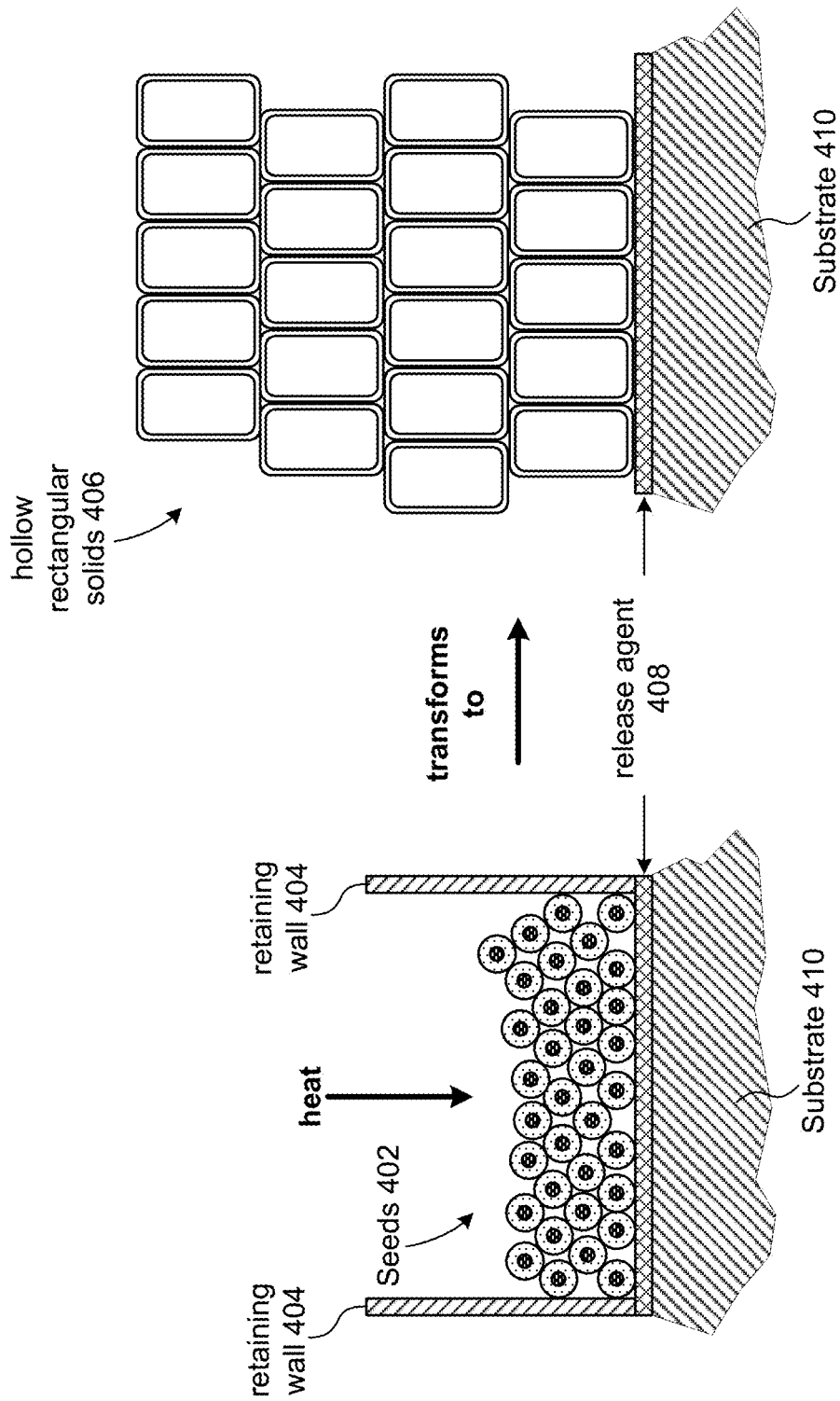
FIG. 4 illustrates how the confined expansion of seeds to hollow spheres can distort the shape of the hollow sphere as well as produce a bulk form with little or no voids between expanded cells.

Conversion of seeds in a confined space will produce a product with minimal open porosity (unoccupied volume between adjacent hollow spheres). In FIG. 4 seeds 402 are converted under conditions where horizontal growth is fixed by retaining walls 404 (e.g., front, back, left, and right). The seeds upon conversion expand their volume (10 to 50 times volume expansion is not unusual). Due to the horizontal confinement, the seeds upon expansion collide with each other, leaving only expansion in the vertical direction. The result is production of hollow rectangular solids 406, or similar structures, with minimal voids between expanded spheres. As expansion occurs, the free space is eliminated, walls between cells bond to each other, leaving a honeycomb type structure. In FIG. 4, heating is from the top of the seeds, but heating can be from any direction. A release agent 408 is interposed between seeds 402 and a substrate 410 that provides support.

Example 3: Restricted Heating with Unconstrained Expansion

Figure 5:
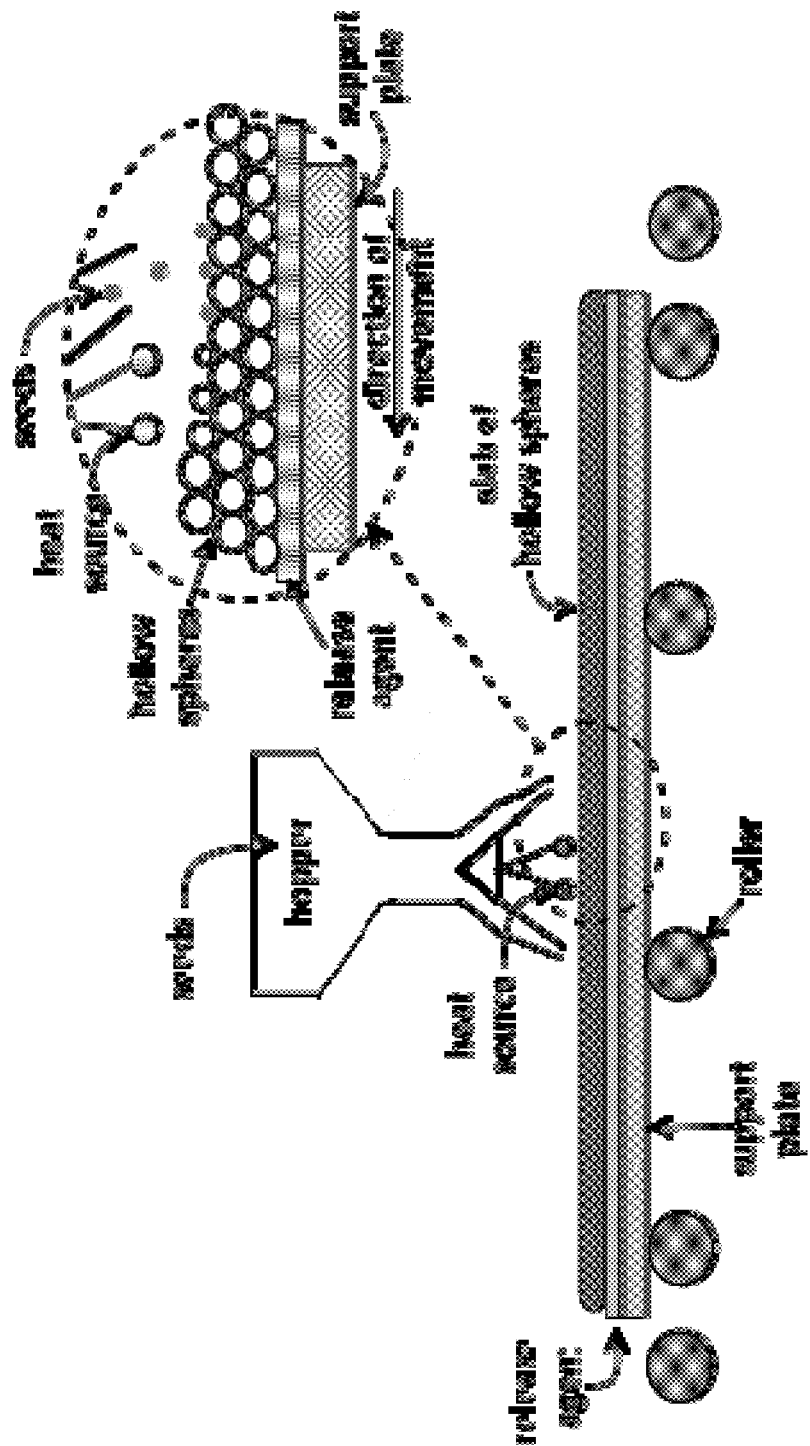
FIG. 5 illustrates a method for converting seeds to hollow spheres, while forming layered sheets of hollow spheres.

In this example, hollow spheres are grown line by line, much like how a television forms a picture. An example of the process is presented in FIG. 5, where we have only a cross sectional view. The hopper distributes a line of seeds that is perpendicular to the view presented in the figure (i.e., perpendicular to the plane of the page). The heating source also extends in a line perpendicular to the presentation in FIG. 5. A large sheet of hollow spheres can be formed, line by line, on the moving support plate as shown in the figure. The line of seeds is deposited on the previous sheet of seed that were converted to hollow spheres. Heating can be restricted to one or two layers such that the hollow spheres formed on previous passes are not significantly altered, and that the newly grown hollow spheres can bond to the walls of the spheres below, to the preceding row of spheres in the same layer, and to the hollow spheres to their right and left. This approach allows for three-dimensional bonding between the hollow spheres, providing cohesion to each layer of hollow spheres and overall strength to the multi-layered product.

This approach produces a sheet of hollow spheres in a near close-pack structure with approximately 26 volume percent interconnected voids. This sheet material can be infused with molten metal, metal powders, gypsum slurry, polymers, and ceramic slip to produce micro- composites with metals, drywall, plastics, and ceramics. This list is not intended to limit potential uses, but only to identify a few possible uses for the hollow spheres.

Example 4: Layered Sheets of Hollow Spheres

In this example, hollow spheres as produced in Example 1 are deposited in sheets as presented in Example 3. Heating can be restricted to one or two layers such that the hollow spheres deposited on previous passes are not significantly altered, and that the newly deposited hollow spheres can bond to the walls of the spheres below, to the preceding row of spheres in the same layer, and to the hollow spheres to their right and left. This approach allows for three-dimensional bonding between the hollow spheres, providing cohesion to each layer of hollow spheres and overall strength to the multilayered product. An entire layer of seed can be processed at one time, since converting seed to hollow sphere is not necessarily involved.

This approach produces a sheet of hollow spheres in a near close-pack structure with approximately 26 volume percent interconnected voids. This sheet material can be infused with molten metal, metal powders, gypsum slurry, polymers, and ceramic slip to produce micro-composites with metals, drywall, plastics, and ceramics. This list is not intended to limit potential uses, but only to identify a few possible uses for the hollow spheres.

Hollow Sphere Modification with an Additive

An additive can chemically reactive or inert. This section discusses additives that can be reactive.

Figure 6A:
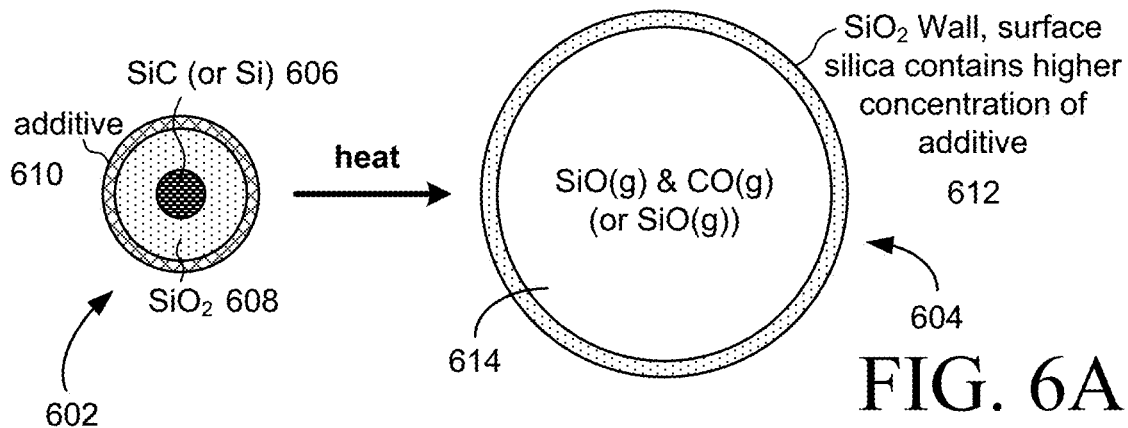
FIG. 6A illustrates the placement of an additive in a seed and how the placement impacts the location of the additive following transformation into a hollow sphere.

FIG. 6A shows a seed 602 and a hollow sphere 604 produced from seed 602. Seed 602 includes a core 606, a coating 608, and an additive 610 on the outside of coating 608. Hollow sphere 604 includes a wall 612 having the additive 610 concentrated near the outer surface of wall 612. Wall 612 defines an interior space 614 of hollow sphere 604.

Figure 6B:
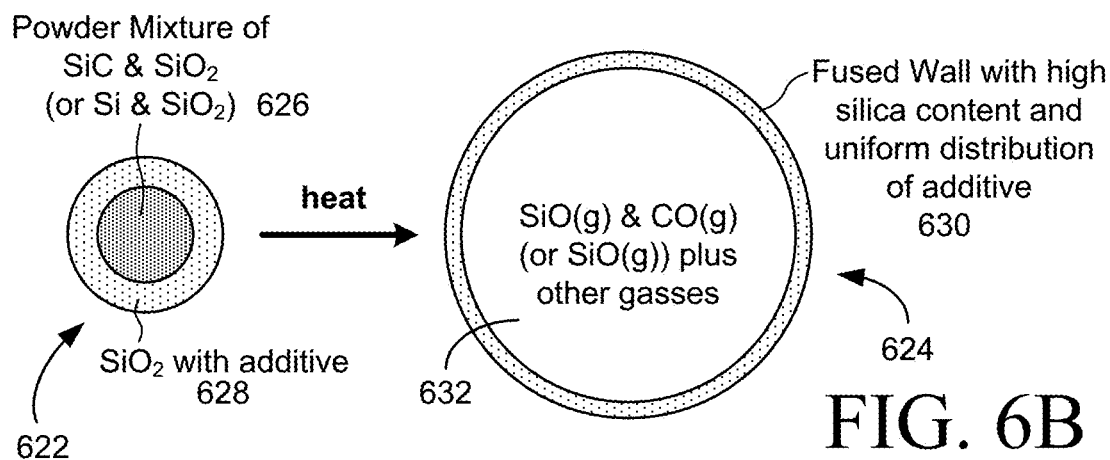
FIG. 6B illustrates another placement of an additive in another seed and how the placement impacts the location of the additive following transformation into a hollow sphere.

FIG. 6B shows a seed 622 and a hollow sphere 624 produced from seed 622. Seed 622 includes a core 626 and a coating 628. Coating 628 has an additive dispersed throughout (e.g., mixed in) the material of coating 628. Hollow sphere 624 includes a wall 630 having the additive distributed throughout wall 630. Wall 630 defines an interior space 632 of hollow sphere 624.

Properties of a hollow sphere can be adjusted through the addition of an additive to its seed. Placement of the additive within the seed impacts where it is found in the hollow sphere. An additive can be placed as an overlay on the exterior surface of a seed as shown in FIG. 6A. Upon transformation of the seed to a hollow sphere the additive is found primarily on the exterior surface of the sphere. There the additive can be modified. An example of a modification is a metal oxide additive, concentrated on the surface of a hollow sphere, reduced by $CO(g)$ or $H_2(g)$ forming small islands of metal that can serve as a catalyst. Complete covering of the exterior surface of the sphere may not be advantageous, because the size of the metal particles can impact the selective nature of a catalyst.

Overall distribution of an additive within the wall of a hollow sphere can be achieved by dispersing it in the silica coating that covers the core of a seed, as presented in FIG. 6B. In this approach some of the additive may react with the $SiO(g)$ and/or $CO(g)$ from reactions 1 and 2, producing either an additional gaseous species or a condensed phase on the inner wall of the hollow sphere.

The comments presented previously in this section also apply to additives added to seeds coated with glass frit. Again, placement of the additive with respect to its position in the seed impacts where it is found in the hollow sphere.

Figure 7A:
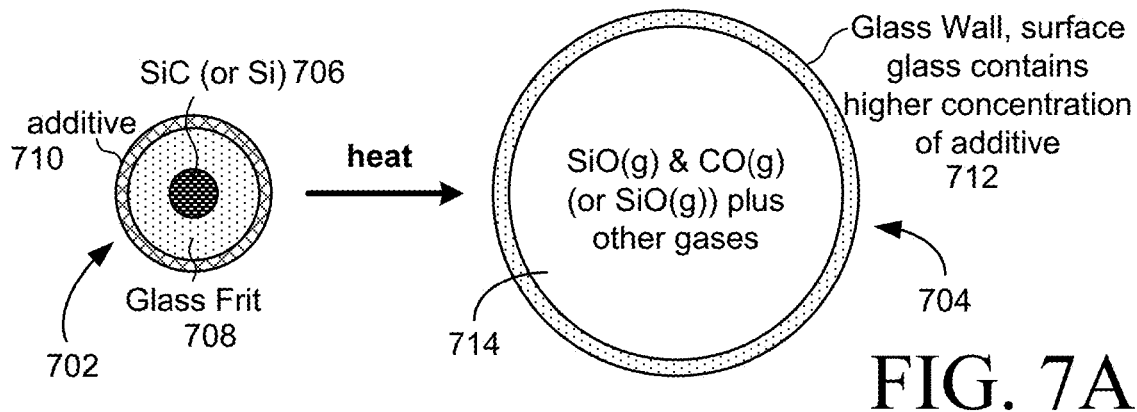
FIG. 7A illustrates the placement of an additive in a seed and how the placement impacts the location of the additive following transformation into a hollow sphere.
Figure 7B:
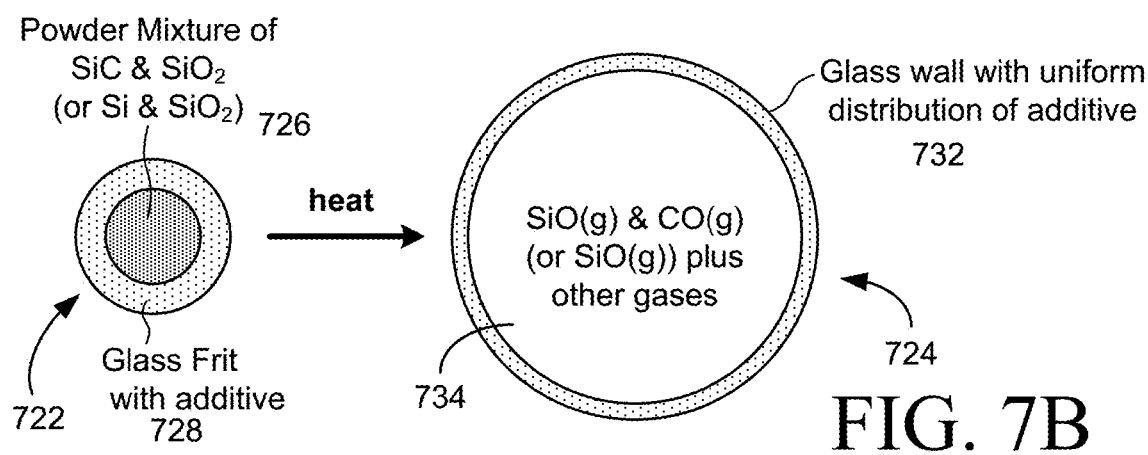
FIG. 7B illustrates another placement of an additive in another seed and how the placement impacts the location of the additive following transformation into a hollow sphere.

FIG. 7A shows a seed 702 and a hollow sphere 704 produced from seed 702. Seed 702 includes a core 706, a glass frit coating 708, and an additive 710 on the outside of coating 708. Hollow sphere 704 includes a wall 712 having the additive 710 concentrated near the outer surface of wall 712. Wall 712 defines an interior space 714 of hollow sphere 704. FIG. 7B shows a seed 722 and a hollow sphere 724 produced from seed 722. Seed 722 includes a core 726 and a coating 728. Coating 728 has an additive dispersed throughout (e.g., mixed in) the material of coating 728. Hollow sphere 724 includes a wall 732 having the additive substantially uniformly distributed throughout wall 732. Wall 732 defines an interior space 734 of hollow sphere 724.

When an additive is included in the silica or glass frit as presented in FIG. 7B, the additive will be nearly uniformly distributed throughout the wall of the resulting hollow sphere. Some chemical reaction between additive and the SiO(g) and or the CO(g) on the interior surface of the hollow sphere can leave reaction products on that surface and/or in the gas inside the hollow sphere. Those issues are eliminated, or nearly so, by placing the additive on the exterior surface of the seed, as shown in FIG. 7A. The additive is found in higher concentration near the exterior surface of the hollow sphere. Any reaction of the additive with the surrounding gas can be controlled by the selection of the gas used.

Hollow Sphere Modification with an Inert

An additive can chemically reactive or inert. This section discusses additives that can be inert.

Figure 8A:
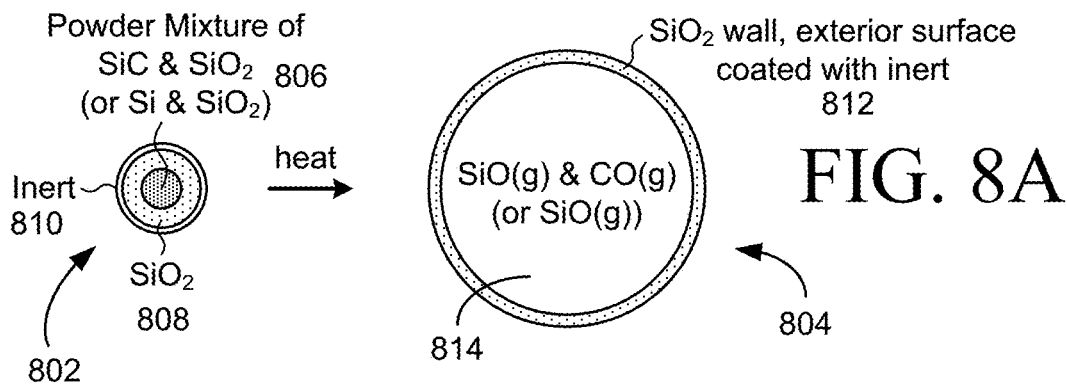
FIG. 8A illustrates the placement of an inert material in a seed with a silica coating and how the placement (outer surface of seed coating) impacts the location of the inert material (exterior surface of sphere) following transformation into a hollow sphere.

FIG. 8A shows a seed 802 and a hollow sphere 804 produced from seed 802. Seed 802 includes a core 806, a coating 808, and an inert 810 on the outside of coating 808. Hollow sphere 804 includes a wall 812 coated with the inert 710 on the outer surface of wall 812. Wall 812 defines an interior space 814 of hollow sphere 804.

Figure 8B:
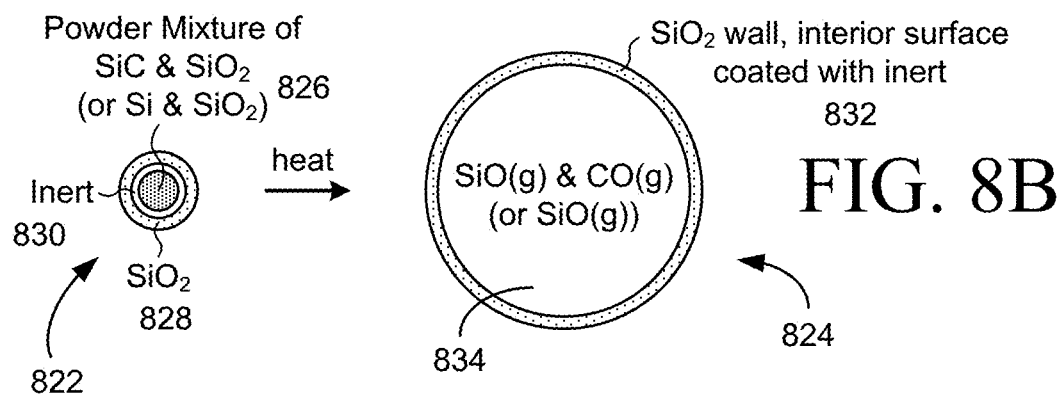
FIG. 8B illustrates another placement of an inert material in a seed with a silica coating and how the placement (between seed core and coating) impacts the location of the inert material (coating on inner surface of hollow sphere) following transformation into a hollow sphere.

FIG. 8B shows a seed 822 and a hollow sphere 824 produced from seed 822. Seed 822 includes a core 826, a coating 828, and an inert 830 disposed between core 826 and coating 828. Hollow sphere 824 includes a wall 832, the interior surface of which is coated with inert 830. Wall 832 defines an interior space 834 of hollow sphere 824.

Figure 8C:
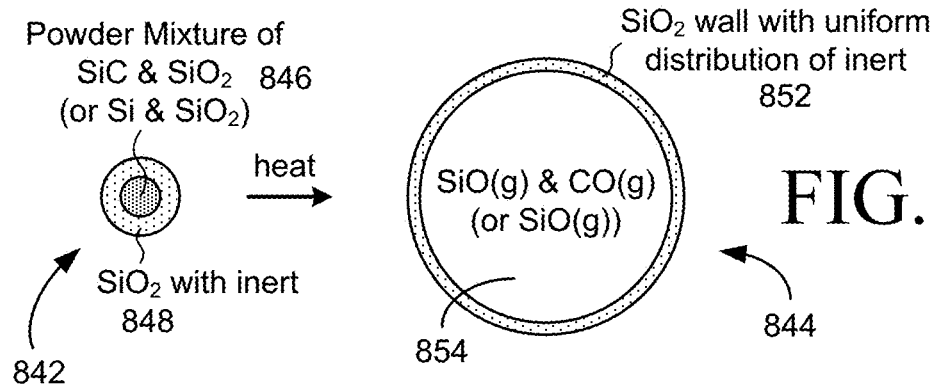
FIG. 8C illustrates another placement of an inert material in a seed with a silica coating and how the placement (dispersed in the coating) impacts the location of the inert material (uniformly dispersed in wall of hollow sphere) following transformation into a hollow sphere.

FIG. 8C shows a seed 842 and a hollow sphere 844 produced from seed 842. Seed 842 includes a core 846 and a coating 848, with an inert dispersed throughout coating 848. Hollow sphere 844 includes a wall 852. The inert is substantially uniformly distributed throughout wall 852. Wall 852 defines an interior space 854 of hollow sphere 844.

Figure 8D:
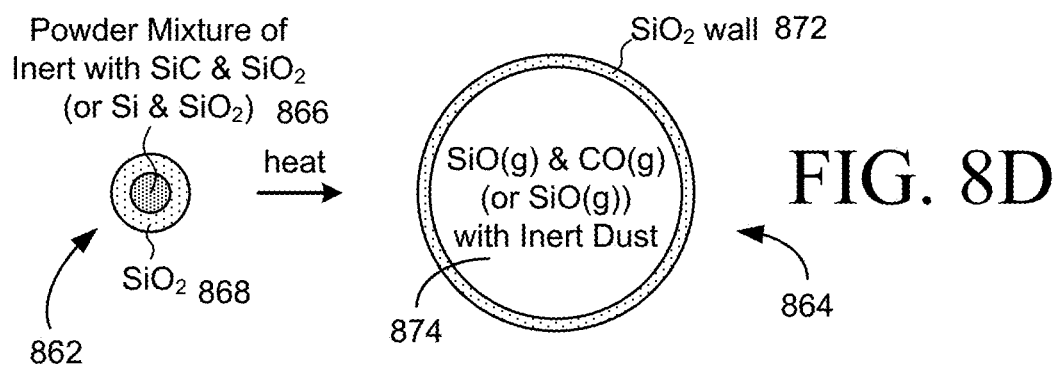
FIG. 8D illustrates another placement of an inert material in a seed with a silica coating and how the placement (mixed in seed core) impacts the location of the inert material (dust within hollow sphere) following transformation into a hollow sphere.

FIG. 8D shows a seed 862 and a hollow sphere 864 produced from seed 862. Seed 862 includes a core 866 and a coating 868. An inert is dispersed throughout (e.g., mixed in) core 868. Hollow sphere 864 includes a wall 872. Wall 872 defines an interior space 874 of hollow sphere 864, and the inert is disposed within space 874 in the form of a dust.

It is also possible to include an inert, or near inert, within the hollow spheres. The term "near inert" is used to describe an element or compound that largely retains its initial composition during the transformation of the seed to final product. In the discussion that follows, "inert" is used to represent both inert and near inert materials.

An inert can exist as a separate layer on the interior or exterior surfaces of the hollow sphere's wall, or the inert can be dispersed within the wall as a separate phase, or the inert can exist as a dust inside the hollow sphere. FIGS. 8A-D illustrate methods for achieving all the previous mentioned distribution of the inert phase for cores coated in silica. By placing an overlay of inert on the seed, the inert will be found on the exterior surface of the hollow sphere, as shown in FIG. 8A. If the inert layer is placed between the seed's core and the silica coat, the inert will be found on the interior surface of the silica wall of the hollow sphere as shown in FIG. 8B. If the inert is mixed with the silica coating the core, as presented in FIG. 8C, the inert will be distributed as a separate phase within the wall of the hollow sphere. If the inert is mixed with the material forming the core of the seed, it will form a dust, or precipitate, contained within the hollow sphere, as presented in FIG. 8D. The core in FIG. 8A can be replaced by SiC (or Si) provided additional silica is included in the coating to account for silica consumed in reaction 1 (or reaction 2).

Glass frit can replace the silica coating shown in FIG. 8, as presented in FIGS. 9A-D.

Figure 9A:
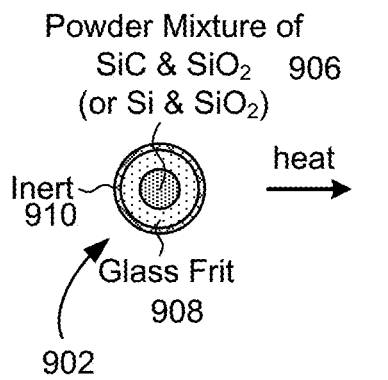
FIG. 9A illustrates the placement of an inert material in a seed with a glass frit coating and how the placement (outer surface of seed coating) impacts the location of the inert material (exterior surface of glass wall) following transformation into a hollow sphere.
Figure 9A:
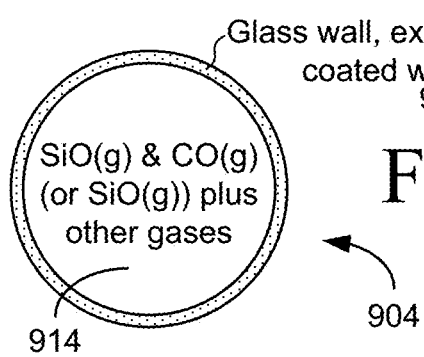

FIG. 9A shows a seed 902 and a hollow sphere 904 produced from seed 902. Seed 902 includes a core 906, a coating 908, and an inert 910 on the outside of coating 908. Hollow sphere 904 includes a wall 912 coated with the inert 910 on the outer surface of wall 912. Wall 912 defines an interior space 914 of hollow sphere 904.

Figure 9B:
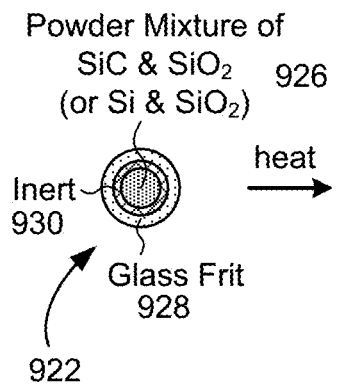
FIG. 9B illustrates another placement of an inert material in a seed with a glass frit coating and how the placement (between seed core and coating) impacts the location of the inert material (coating on inner surface of glass wall) following transformation into a hollow sphere.
Figure 9B:
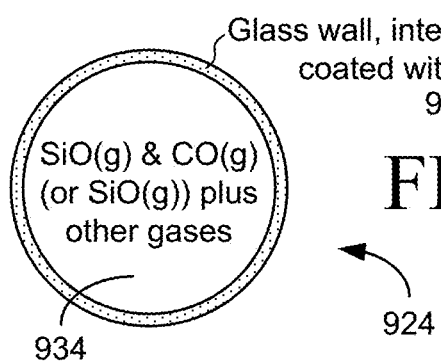

FIG. 9B shows a seed 922 and a hollow sphere 924 produced from seed 922. Seed 922 includes a core 926, a coating 928, and an inert 930 disposed between core 926 and coating 928. Hollow sphere 924 includes a wall 932, the interior surface of which is coated with inert 930. Wall 932 defines an interior space 934 of hollow sphere 924.

Figure 9C:
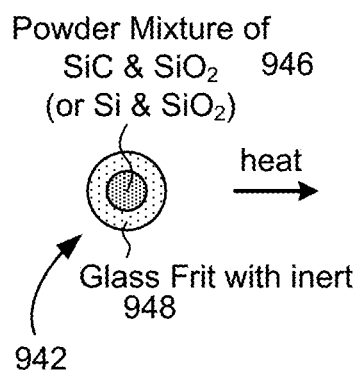
FIG. 9C illustrates another placement of an inert material in a seed with a glass frit coating and how the placement (dispersed in the coating) impacts the location of the inert material (uniformly dispersed in glass wall) following transformation into a hollow sphere.
Figure 9C:
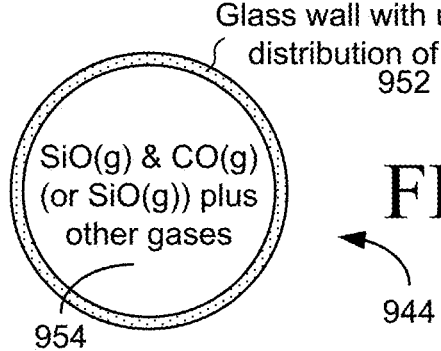

FIG. 9C shows a seed 942 and a hollow sphere 944 produced from seed 942. Seed 942 includes a core 946 and a coating 948, with an inert dispersed throughout coating 948. Hollow sphere 944 includes a wall 952. The inert is substantially uniformly distributed throughout wall 952. Wall 952 defines an interior space 954 of hollow sphere 944.

Figure 9D:
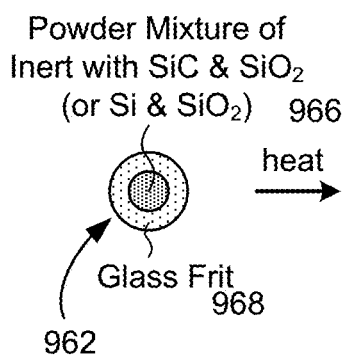
FIG. 9D illustrates another placement of an inert material in a seed with a glass frit coating and how the placement (mixed in seed core) impacts the location of the inert material (dust within hollow sphere) following transformation into a hollow sphere.
Figure 9D:
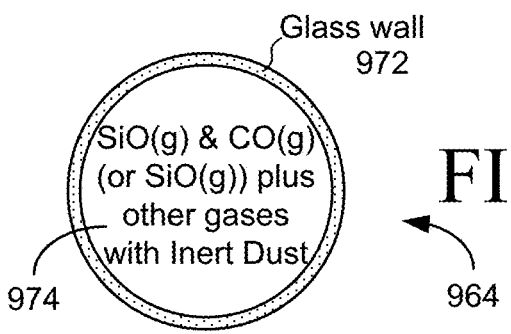

FIG. 9D shows a seed 962 and a hollow sphere 964 produced from seed 962. Seed 962 includes a core 966 and a coating 968. An inert is dispersed throughout (e.g., mixed in) core 966. Hollow sphere 964 includes a wall 972. Wall 972 defines an interior space 974 of hollow sphere 964, and the inert is disposed within space 974 in the form of a dust.

Again, an inert layer can be positioned as an overlay on the seed with the inert coating the exterior surface of the hollow sphere as presented in FIG. 9A. The interior surface of the hollow sphere can be coated with an inert by placing the inert between the seed's core and the glass frit, as shown in FIG. 9B. If the inert is included with the glass frit, as presented in FIG. 9C, it will be distributed as a separate phase within the glass wall of the hollow sphere. Mixing the inert with the material forming the core will leave the inert as a dust or precipitate within the hollow sphere, as shown in FIG. 9D.

Figure 10A:
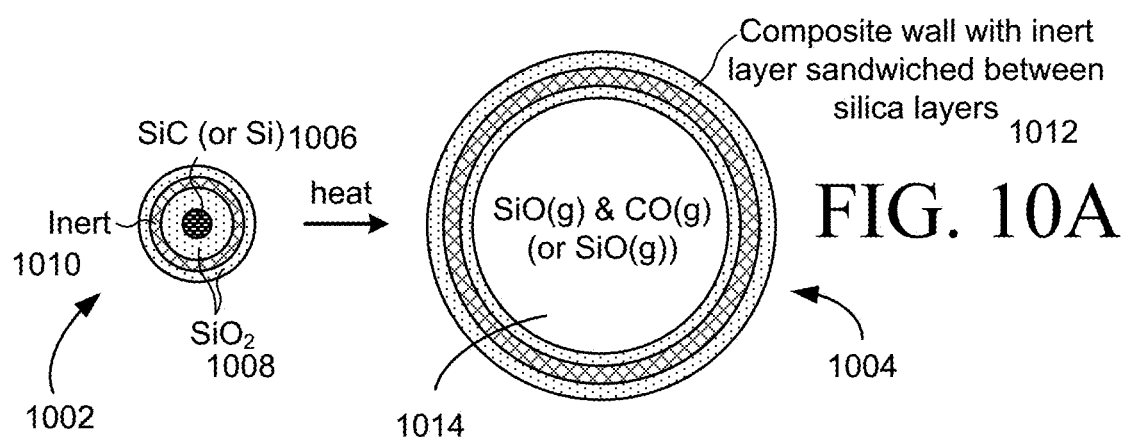
FIG. 10A illustrates a method for sandwiching an inert layer between silica layers in a hollow sphere.
Figure 10B:
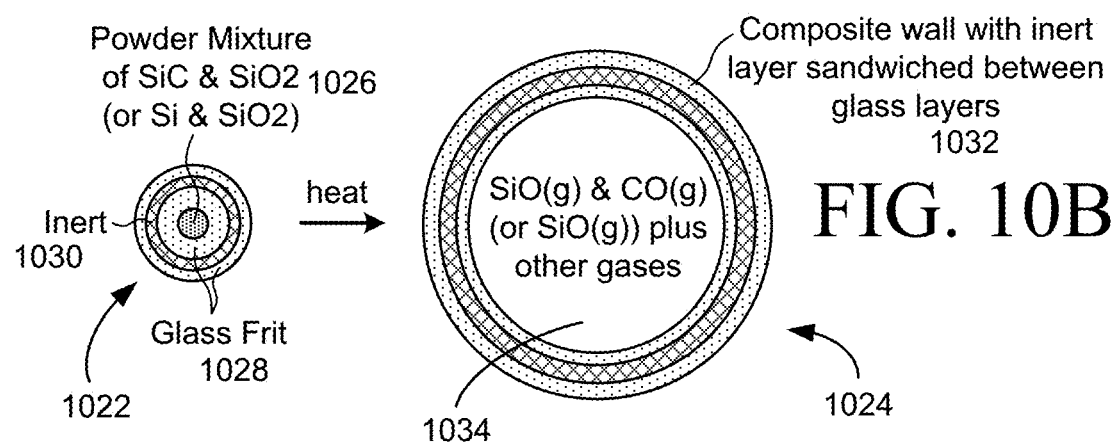
FIG. 10B illustrates a method for sandwiching an inert layer between glass layers in a hollow sphere.

It is also possible to sandwich an inert layer between layers of silica or glass that form the wall of a hollow sphere as shown in FIG. 10. The core in FIG. 10A can be replaced with a mixture of SiC and $SiO_2$ (or Si and $SiO_2$), as shown in FIG. 10B.

FIG. 10A shows a seed 1002 and a hollow sphere 1004 produced from seed 1002. Seed 1002 includes a core 1006, a coating 1008, and an inert 1010. Coating 1010 includes an inner layer and an outer layer, and inert 1010 is disposed between the inner and outer layers. Hollow sphere 1004 includes a multi-layered wall 1012, including an inner layer, an outer layer, and a layer of inert 1010 disposed therebetween. Wall 1012 defines an interior space 1014 of hollow sphere 1004.

FIG. 10B shows a seed 1022 and a hollow sphere 1024 produced from seed 1022. Seed 1002 includes a core 1026, a coating 1028, and an inert 1030. Coating 1028 includes an inner layer and an outer layer, and inert 1010 is disposed between the inner and outer layers. Hollow sphere 1024 includes a multi-layered wall 1032, including an inner layer, an outer layer, and a layer of inert 1030 disposed therebetween. Wall 1032 defines an interior space 1034 of hollow sphere 1024.

Use Examples

Examples presented below are not intended to limit the scope of the invention, but to illustrate some of the variations that can be employed to produce desired results; alter properties, modify existing materials, and develop new products.

Example 5: Optical Properties

"Optical" is used here to apply to all electro-magnetic signals. The composition of the wall of the fused silica or glass of a hollow sphere can have a chemistry that absorbs (through addition of an additive) or diffusely reflects (through inclusion of an inert) photons or any and all electro-magnetic signals. Hollow spheres with color can be used in paint, metals, ceramics, and/or organics.

(a) Paint Pigment

In paint, pigment is added to a neutral or colorless binder to provide color. The binder serves to bind particles of pigment to each other keeping them in place but does not isolate the pigment from the environment. Both the permanence and stability of the pigment are critical properties to the consumer. Pigments in paint tend to fade over time with exposure to sunlight. The ultraviolet portion of sunlight has the energy to break chemical bonds. Those atoms with broken bonds typically react with oxygen in air, altering the color of the pigment.

Elements and compounds can be added to silica and glass to produce color. Those elements and compounds are referred to here as color-centers. A color-center in stained glass is isolated, in the glass, from the atmosphere, and thus cannot bond to oxygen in the air. The permanence of color-centers in glass far exceeds that of pigment used in paint. By including an additive in the wall of a hollow sphere as presented in FIGS. 6 and 7, the hollow sphere contains an assemblage of color-centers that can substitute for pigment used in paint. The result is a paint with significantly greater durability.

Hiding power is another important factor in selecting a paint. Without adequate hiding power multiple coats must be applied to eliminate the visibility of what is below the paint. Titanium dioxide pigment (with specific crystal structure and size) is an exemplar used for its hiding power. A layer of titanium dioxide pigment can be included with hollow spheres, and with additives used to produce color. The processes for including an inert layer are presented in FIGS. 8B, 9B, and 10.

Figure 11:
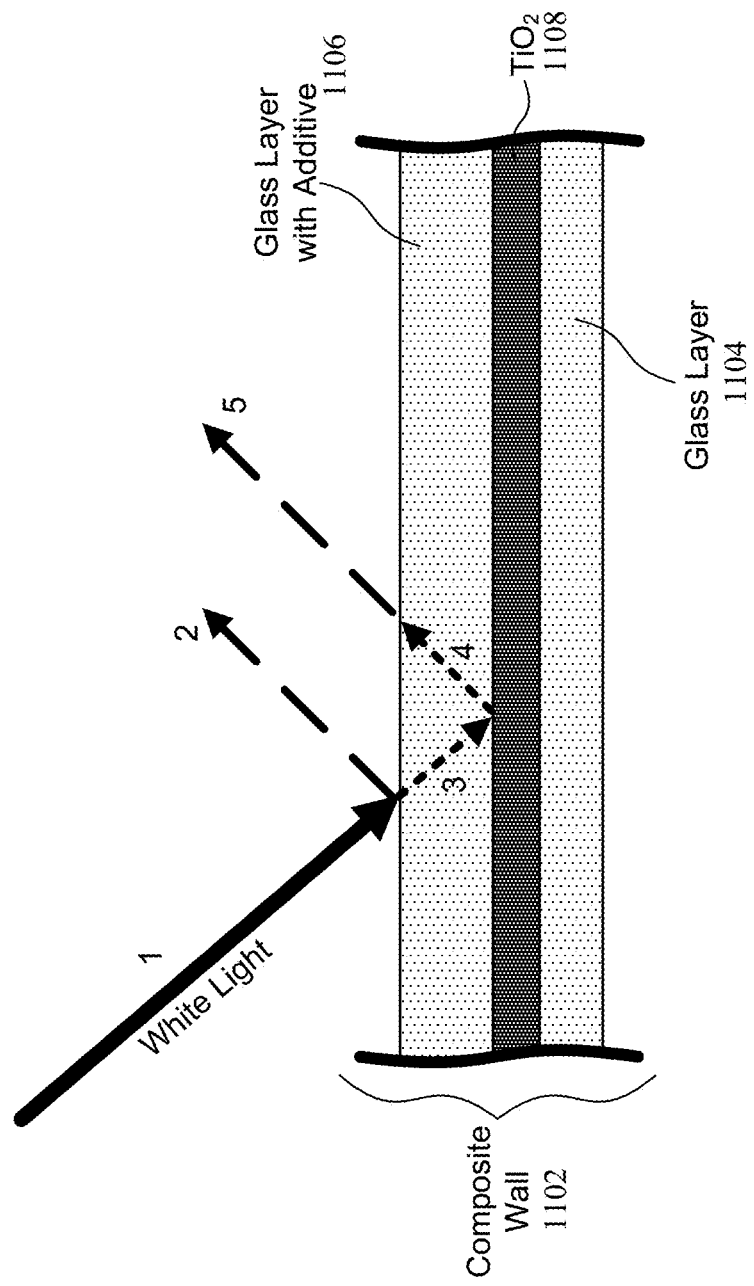
FIG. 11 illustrates how a layer of $TiO_2$ within the wall of a hollow sphere produces color.

An example of a portion of the wall of a sphere containing a layer of $TiO_2$ pigment is presented in FIG. 11. A composite wall 1102 includes an inner glass layer 1104, and outer glass layer 1106, and an intermediate layer 1108 (e.g., $TiO_2$) disposed therebetween.

In that figure the full spectrum of visible light, as a packet of photons and identified as White Light (1) strikes the exterior glass layer that contains an additive that in the glass produces color-centers for blue light. A color-center absorbs the full spectrum of the white light, except that of blue light. Some of the photons in the white light contact color-centers at the exterior surface of the hollow sphere, and that portion of the light that is blue is reflected as represented by the arrow numbered 2 in the figure while the rest of the spectrum is absorbed. A portion of the white light photons pass through the exterior surface of the glass layer without initially contacting a color-center. However, as those photons move through the glass layer some of the photons contact color-centers and the light begins to turn blue as represented by arrow number 3. All the photons of visible light that contact the titanium dioxide layer are reflected. Again, as that reflected light passes through the glass layer with its color-centers more of the non-blue light is absorbed and the reflected blue light passes through the glass layer, as represented by arrow number 4, and the light that eventually leaves has an enhanced blue color (arrow number 5). The titanium dioxide layer reflecting all visible light provides the hiding power, while the color-centers in the glass only allow blue light to be transmitted and reflected.

(b) Coloring of Metals

In the previous example, glass frit was used to produce hollow spheres that provide color for use in paint. In this example, color is generated with hollow spheres in a metal matrix as proposed in U.S. Provisional Patent Application No. 62/892,619, which is incorporated herein by reference in its entirety. The primary issue is maintaining adequate viscosity such that the wall of the hollow sphere does not collapse at the temperature of the molten metal. Hollow silica forms, as produced in Examples 3 and 4, can be infused with molten metal or infused with metal powder, the latter fused through use of induction heating. The result is a micro composite of metal and hollow spheres. Moreover, if the hollow spheres contain color-centers, the color exists throughout the composite.

An additive to the silica surrounding the core as presented in FIG. 6B can be specifically chosen to produce desired color-centers retained in the silica wall of the hollow sphere. The additive will lower the viscosity of the silica wall. That factor must be balanced with the desired color and temperature for producing the composite.

Figure 12:
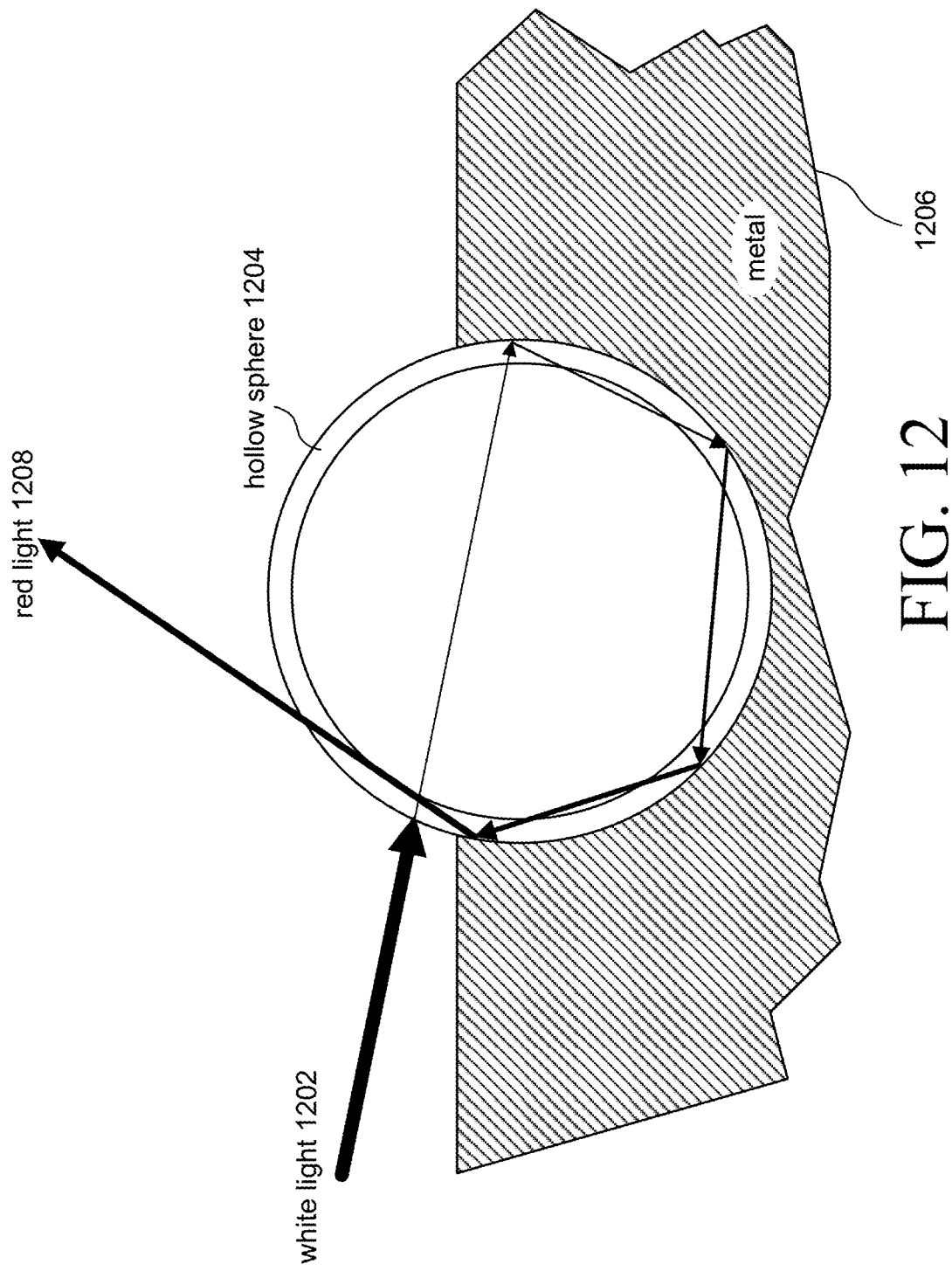
FIG. 12 illustrates how a hollow sphere with color centers produce color.

In FIG. 12 white light 1202 enters a hollow sphere 1204 with a wall that absorbs all visible light except that wavelength that produces the color red. As the white light 1202 is reflected by the metal 1206, forcing the light to pass back through the wall of the hollow sphere, more and more of the non-red light is absorbed. The overall impact is to produce a metal-hollow sphere micro-composite that appears to have a bright red color 1208. Initially, some red light is reflected as the white light enters the hollow sphere. However, that initially reflected red light is not shown in FIG. 12, because the intent of FIG. 12 is to demonstrate how the hollow sphere can concentrate color.

(c) Mitigation of Radar Signal

Mitigation of radar is a complex problem involving scattering, signal attenuation, and signal absorption. The problem is further complexed by signal wavelength and use of multiple wavelength radar. Other physical issues include magnetization (hard or soft), heat dissipation with absorption of radar, and reflectance of visible light.

Radar is a nonionizing radiation that can come from any direction and its reflection must be minimized if the goal is to avoid detection for military assets. One radar absorbing material (RAM) consists of tiny cenospheres coated with iron. The iron is deposited on the sphere by decomposition of iron carbonyl gas [$Fe(CO)_5$]. Cenospheres, as explained above, have a weight disadvantage as compared to decomposing iron carbonyl gas on hollow silica spheres produced as presented in FIGS. 1A and 1B. These iron coated spheres are further coated with a protective and non-conducting material such as silica. The coating serves to prevent both loss of iron due to abrasion, and conversion of iron to iron oxides with reduced magnetic properties. The coated cenospheres are applied to surfaces in an epoxy, also known as iron ball paint.

Use of iron carbonyl is dangerous. It can be fatal if inhaled, absorbed through the skin, or swallowed. It is a strong reducing agent that poses a significant risk in contact with oxidizing agents. Iron carbonyl, in both liquid and vapor forms, is extremely flammable. It is pyrophoric in the presence of air, and it is also light sensitive. The compound in an inert atmosphere decomposes on heating; one mole of the carbonyl forms one mole of iron and 5 moles of carbon monoxide. Rapid heating can cause an explosion due to rapid release of gas.

The procedure presented in FIG. 7B can be used to produce a RAM without using iron carbonyl. In that figure a glass frit surrounding the core contains an additive. Selecting a glass frit with a significant concentration of iron oxides results in the production of a hollow sphere with elemental iron particles dispersed throughout the wall. The elemental iron particles are formed by including a reducing additive to the glass frit. Examples of acceptable reducing agents include, but are not limited to, aluminum, magnesium, calcium, vanadium, titanium, and silicon. Upon heating and transitioning from seed to hollow sphere in an inert atmosphere, the reducing agent reacts with the iron oxides, reducing the latter to elemental iron with the additive joining the glass as an oxide. Since the iron oxides are initially in the glass frit, and thereby finely distributed, the elemental iron (produced by reaction between the additive and the iron oxides) forms a finely distributed and separate phase in the wall of the hollow sphere. The particles of elemental iron are encapsulated in a nonelectrical conducting glass that now contains the oxidized reducing agent. The size of the iron particles can be controlled by heat soaking the hollow sphere to allow iron atoms to migrate and form clusters.

Hollow spheres formed by reaction between SiC and $SiO_2$ (reaction 1) have an additional capability for absorbing radar signal. Reaction between silicon carbide and silica produces SiO(g) and CO(g) at a molar ratio of 3 to 1. Upon cooling the hollow-sphere the gas inside the sphere undergoes the initial reaction $$3SiO(g) \rightarrow 3/2Si + 3/2SiO2 \quad (3),$$

thereby raising the concentration of CO(g) inside the hollow sphere. That reaction increases the concentration of CO which promotes the reaction $$CO(g) + 3/2Si \rightarrow SiC + \frac{1}{2}SiO_2 \quad (4)$$

Reaction 3 readily occurs, producing a particulate mixture of Si and $SiO_2$. Rapid cooling produces smaller particles. Reaction 4 can produce a protective coating of SiC on the Si particles. This is an unlikely occurrence if the temperature for reaction 3 is low enough to produce very small particulates. If large particles of Si can form by reaction 3, then reaction 4 can produce a protective coating. Carbon dioxide gas will remain inside the hollow sphere but will undergo disproportionation by the reaction $$2CO(g) \rightarrow C + CO_2(g) \quad (5)$$

This reaction begins at temperatures below 700° C. and can be effectively stopped at temperatures below 400° C.

Thus, it is possible to produce a hollow sphere with:
(a) a near absolute vacuum due to reactions 3 and 4, and with a mixture of fine powders of SiC and $SiO_2$ coating the interior surface of a hollow sphere; or
(b) a CO(g) atmosphere, and with a mixture of fine powders of C, Si, and $SiO_2$ coating the interior of the hollow sphere; or
(c) a CO(g) and $CO_2(g)$ atmosphere, and with a mixture of C, Si, SiC, and $SiO_2$ coating the interior of a hollow sphere; or
(d) a CO2(g) atmosphere, and with a mixture of fine powders of C, Si, SiC, and $SiO_2$ coating the interior surface of a hollow sphere.

Silicon carbide and carbon (with a small percentage of graphite) absorb radar. Mitigation of the radar signal is accomplished with both the elemental iron in the wall of the hollow sphere and the combination of SiC and C dust in the interior of the hollow sphere.

Absorption of radar waves produces heat. Sheets of radar absorbing hollow spheres as per the process presented in Examples 3 and 4 include 26 volume percent of interconnected voids. That void space can be used to pass a cooling phase through the radar absorbing structure to remove heat. Heat removal is important to prevent a plane or ship from emitting an inferred signal.

Hollow spheres with color centers can be used to camouflage the visual appearance of a ship, plane, or other military vehicle. The hollow spheres used for camouflage can be included as an external layer to the radar absorbing sheets of hollow spheres.

(d) Ultraviolet Light Filter

Ultraviolet light (UV) is known to kill pathogens. It is also known to be harmful to humans, causing skin cancer and cataracts. Broad-spectrum UV electromagnetic radiation with wavelength from 10 nm to 400 nm, is shorter than that of visible light but longer than X-rays. The shorter the wavelength the more energy it contains and the more harmful it is to animal life. Broad-spectrum UV light is not used in public places. Far-UV light with wave lengths of 122 to 200 nm cannot penetrate through the outer layer of dead skin cells or the tear layer in eyes, so it is not harmful to humans. Far-UV light can kill viruses and bacteria, penetrating their protective layer and destroying their DNA.

Additive and/or inert can be added to seeds as presented in FIGS. 6 through 10 to produce hollow spheres that can absorb all but the far-UV light from the broad-spectrum UV light. Filters made from those hollow spheres make it possible to use inexpensive UV light sources in the presence of humans to kill pathogens. Filters made using layered sheets of hollow spheres as presented in Examples 3 and 4 provide a means for cooling the filter while in use.

Example 6: Light Weight Copper Filters

Copper is known to kill pathogens. Hollow spheres with copper on exterior surfaces can provide both high surface area and low density. The latter factor is particularly important for aircraft, and to a lesser extent for trains autos, and ships.

Elemental copper on the exterior surface of a hollow sphere can be produced by applying copper oxide as an overlay on seeds as presented in FIGS. 6A and 7A. The resulting coating of copper oxide on the exterior surface of the hollow spheres can be converted to metallic copper using a reducing gas at an elevated temperature.

Other Practical Applications

Examples of other potential uses for hollow silica and hollow glass spheres are presented in terms of general properties. To simplify the presentation that follows "hollow spheres" is used to represent both hollow silica and hollow glass spheres. When the need arises to specify one or the other, silica or glass will be included.

I. Filler or Extender Hollow spheres can be added to a liquid or a slurry. Viscosity of a fluid impacts the size, and wall thickness of the hollow spheres used, and the method for producing a composite with the spheres.

Highly viscous materials such as wet concrete, ceramic slurry, polymers, and glass minimizes separation of hollow spheres from the fluid due to buoyant force, but create significant shearing forces that can destroy hollow spheres during mixing. That problem is decreased by using smaller diameter spheres with larger wall thickness. The impact of the buoyant force is also reduced with size reduction, and thus hollow spheres, formed as per "Example 1 The Plasma Torch" can be added to the viscous fluid during mixing. The plasma torch is used here only as an example of any process designed to produce individual hollow spheres, as compared to Examples 2 through 4 where forms consisting of many hollow spheres are produced. The following uses are not intended to be limiting, but are rather just a few examples of hollow spheres can be incorporated in viscous materials to deliver desired properties.

Low Weight Concrete

Hollow spheres can replace aggregate (e.g., sand and stone) in concrete and reduce its density from 2,400 to 860 kg/m$^3$. Light weight concrete with hollow spheres can be advantageous in, by way of non-limiting example, floors and in support columns in the upper levels of buildings where vertical forces are less, but flex resistance is important.

Low Weight Ferrocement for Boats and Small Ships

Ferrocement is a construction system using steel reinforcement with Portland Cement, sand, and water. The ratio of cement to sand is typically 3 to 1. No gravel is used, so that the material is not concrete. Hollow spheres can substitute for sand. Reducing the weight of the mortar up to or more than 20%.

Low Weight Fiber Cement Siding and Roof Tiles

Fiber cement boards and tiles contain a significant, but variable, percentage of sand ranging from 25 to 60 weight percent. That sand can be replaced by hollow spheres. A grain of sand consisting of silica has a specific density of 2.2 g/cm$^3$ while hollow spheres have a specific density of 0.058 to 0.22 g/cm$^3$. The reduced density of the aggregate added to the siding and/or tiles reduces the amount and expense of the supporting structure.

Low Weight Fired Clay Roof Tiles

Hollow silica spheres and some hollow glass spheres can be included in the mix used to produce green clay roof tile that are fired at temperatures up to 1000° C. The inclusion of hollow spheres in roof tiles reduce their weight up to and more than 70 percent. The firing of the green tiles bonds the walls of the hollow spheres to the clay providing physical strength. The reduced weight associated with the hollow spheres reduces the amount and expense of the supporting structure.

Low Weight Drywall

Hollow spheres added to the gypsum slurry used to make drywall can reduce the weight by as much as 70% and decrease its thermal conductivity.

Forms of hollow spheres (any three-dimensional shape of hollow spheres connected to each other), as presented in Examples 3 and 4, have open and interconnected porosity amounting to as much as and more than 26 volume percent. These forms, when anchored, can be infused with low viscosity fluids. The following uses are not intended to be limiting but are only a few examples of how hollow spheres can be incorporated in low viscosity materials to deliver desired properties.

Metal and Hollow Sphere Composites

Hollow spheres in a metal matrix composite can reduce density and thereby replace expensive nonferrous alloys with a base metal with superior properties. One example is producing a steel and hollow silica sphere composite for replacing an aluminum alloy. The composite will have a lower density, greater weldability, and improved resistance to fatigue failure, as compared to the aluminum alloy. The composite formed with hollow spheres with a density of 0.25 g/cm$^3$ and stainless steel with a density of 7.9 g/cm, yields a composite density of 2.2 g/cm$^3$, as compared to the 2.7 g/cm$^3$ for aluminum. The composite density is based on close packing of a single size of hollow spheres, with spheres occupying 74% of the composite's volume.

Metals that can be used with hollow silica spheres include, but are not limited to, iron, copper, nickel, cobalt, chrome, zinc, vanadium, tin, cadmium, silver, gold, platinum, palladium, molybdenum, and lead. Composites formed with these metals can be configured to achieved desired values of any of the following properties: density, yield and tensile strengths, hardness, flexibility, toughness, resistance to abrasion, corrosion, fatigue, thermal expansion, conductivity, weld ability, magnetic permeability, and cost. This list is not intended to be limiting.

II. Sound Reduction and Heat Transfer

The vacuum that exists inside hollow spheres alters the physical characteristics of the transfer of both heat and sound, contributions that make their use in some products desirable. Sound abatement has usually required high density materials. However, sound cannot pass through a vacuum. By carefully heat treating the hollow spheres the internal pressure of a hollow sphere formed through reaction between SiC and SiO$_2$ will be near or below $10^{-10}$ bar, while for hollow spheres formed by reaction between Si and SiO$_2$ the internal pressure will be near or below $10^{-8}$ bar. Convective heat transfer requires a fluid (gas or liquid) to move energy as heat from a higher temperature source to a lower temperature sink. Thus, the near absolute vacuum inside the hollow spheres restricts both heat transfer by convective processes and transmission of sound.

Drywall with Hollow Spheres

Energy savings and reduced carbon emissions with hollow spheres in drywall are presented in Table 2. EPA estimates that the average house in the U.S. is responsible for release of 8.67 tonnes of CO$_2$ per year. It is assumed, here, that 40% of those emissions is due to heating, or 3.47 tonnes per year per house. It has been further assumed that the average U.S. house has 40 m$^2$ of wall and ceiling that is exposed to the surroundings. Energy losses have been calculated for those surfaces assuming interior and exterior temperatures of 21° C. and 3° C., respectively.

The numbers in the table below, are for a two-layer composite wall with heat being transferred through drywall (with & without hollow spheres) and then through batt (with thickness 3 or 4 inches). The batt is assumed to have an R-value of 4. That assumption is consistent with values associated with loose cellulose, fiberglass (both blown and in batts), and rock wool (both blown and in batts) as all possess R-values of approximately 2.5 to 4. The computed numbers for drywall, drywall with hollow spheres, and batts are presented in the Table 2. While the numbers in Table 2 are for hollow silica spheres, similar results are obtained for hollow glass spheres in drywall.

TABLE 2

Computed Results for Impact of HSMS* in Drywall on $CO_2$ Emissions

| material | $\tau$** | Thermal Conductivity $\left(\dfrac{W}{mK}\right)$ | R-value $\left(\dfrac{K\,m^2}{W}\right)$ | Reduction in Heat Loss*** (%) | Reduction of $CO_2$ Emissions per house per year (tonnes $CO_2$) |
|---|---|---|---|---|---|
| Batt, thickness 4 in. | 1 | 0.0064 | 4 | — | — |
| Drywall 1 in. | 1 | 0.17 | 0.15 | 0 | 0 |
| Drywall & HSMS 1 in. | 7 | 0.021 | 1.12 | 6.1 | 0.21 |
| Drywall & HSMS 1 in. | 15 | 0.0099 | 2.57 | 13 | 0.45 |
| Drywall & HSMS 1 in. | 25 | 0.0059 | 4.28 | 20 | 0.71 |
| Batt, thickness 3 in. | 1 | 0.0064 | 4 | — | — |
| Drywall 1 in. | 1 | 0.17 | 0.15 | 0 | 0 |
| Drywall & HSMS 1 in. | 7 | 0.021 | 1.12 | 7.9 | 0.27 |
| Drywall & HSMS 1 in. | 15 | 0.0099 | 2.57 | 17 | 0.58 |
| Drywall & HSMS 1 in. | 25 | 0.0059 | 4.28 | 25 | 0.88 |

*HSMS is Hollow Silica Microspheres
**tortuosity
***comparison is with respect to the drywall Hollow spheres, with an interior vacuum and at close-pack density in the drywall, have a significant impact on conduction of heat because of the nonconductive nature of the vacuum. Volume distribution in drywall containing hollow spheres is 26% partially hydrated $CaSO_4$ (which is the standard drywall material), 7.5% silica, and 66% voids in the spheres. The voids, having a pressure approaching 0, do not conduct heat, but radiant heat transfer can occur in a void, but its impact, in this instance, will be small.

Radiant heat transfer in the hollow spheres will be small due to the low temperatures involved, the thermal conductivity of silica with respect to the standard drywall material, and the small diameter of the voids. Silica is used here only as an example. Many glasses have slightly smaller thermal conductivities. Silica has a higher thermal conductivity than that of the $CaSO_4$; the ratio having a value of 8.1. With spheres in a close-pack arrangement, a sphere has infinitesimally small points of contact with other spheres. Heat races around the silica wall of a sphere, but its escape to a sphere at a lower temperature is slowed by the minimal contact it has with other spheres, and the lower thermal conductivity of the surrounding $CaSO_4$. Given the very small diameter of the hollow spheres as compared to the thickness of the drywall and the small temperature drop across the drywall, it is assumed that the silica wall of a hollow sphere is at near uniform temperature. Radiant heat transfer across the void inside the hollow sphere from one side to the other occurs. However, the reverse transfer of radiant heat also occurs. Since the temperature of the silica wall of a hollow sphere is nearly uniform the two radiant heat fluxes cancel each other.

The physical structure of a material containing more than one phase (such as drywall with hollow spheres) impacts heat transfer. The impact of the physical structure of the separate phases on heat transfer is accounted for by a tortuosity factor, $\tau$. The minimal contact between the hollow spheres can be viewed as a roadblock to heat transfer. It is a choke point. Choke points are where the cross-sectional area perpendicular to the flow of heat in a thermally conducting phase is diminished. The movement of heat across the drywall with hollow spheres cannot move in a straight path as the voids in the hollow spheres block that path, thereby increasing the distance for heat transfer. The hollow spheres also create choke points in the $CaSO_4$ phase.

In a homogeneous drywall tortuosity has a value of 1. While a drywall with hollow spheres will have a tortuosity greater than 1, the value increasing with path length and the presence of choke points. With multiple phases in the drywall, one views the drywall as containing tubes of the individual material extending through the thickness of the drywall. If these tubes are straight, uniform, and randomly oriented, $\tau$ has a value of 2. If the tubes are not straight and not uniform the value of the tortuosity climbs quickly. The close-pack arrangement of the spheres in the drywall increases the length of the path for heat transfer through the $CaSO_4$, and, also, adds numerous choke points in that phase. Inclusion of the hollow spheres in the drywall will produce an increase in the tortuosity. The value of $\tau$ can be significantly increased by using at least two different sizes of hollow spheres while retaining a close-pack structure with the largest sized hollow spheres; the combination producing additional numerous choke points in the $CaSO_4$ phase.

Inclusion of hollow spheres in drywall can reduce heat loss from a house by as much as or more than 20%. That 20% corresponds to a reduction in $CO_2$ emissions of 0.71 tonnes per house per year. If all houses built in 2018 used drywall containing hollow silica spheres, the reduction in $CO_2$ emissions would have been 610,000 tonnes in 2019. Over a ten-year period, the reduction would be 6.1 million tonnes. If during that ten-year period all new houses were built using wallboard containing hollow spheres, the $CO_2$ reduction would amount to more than 33 million tonnes.

Reducing the Thermal Conductivity of a Metal

Steel is used here, and in general, as a non-limiting example of what can also be achieved with metals. The thermal conductivity of a steel-hollow sphere composite can be estimated by making a few assumptions. First the composite is viewed as consisting of a series of rods composed of steel in a non-thermal conducting media composed of the hollow spheres. That assumption is possible as the hollow spheres have near total vacuum, and that the wall of the spheres in the composite constitute a small portion of the total composite volume. It is also assumed that only molecular conduction of heat occurs, and that the steel rods are assumed to be subject to a tortuosity factor of 5. A value of 2 for the tortuosity is based on uniform rods of steel with random orientation. It is likely that the tortuosity will be higher based on the path and choke points created in close-pack structure, thus a value of 5 was selected. The thermal conductivity of steel is 16.3 W/m·K. That value is reduced by both the volume fraction of steel in the composite and by the tortuosity factor. The resulting thermal conductivity of the composite is estimated to be 0.84 W/m·K. As in other examples, the tortuosity factor can be increased by methods including, but not limited to, using a mixture of hollow spheres having different sizes.

VacuSpheres

Hollow spheres can be formed with internal pressures as low as approximately $10^{-8}$ bar. Hollow spheres with internal pressures below 0.001 bar are referred to herein as VacuSpheres. The low pressure in VacuSpheres eliminates almost all of the heat transfer by natural convection. The lower the internal pressure, the smaller is the convective heat transfer. VacuSpheres can be produced as individual spheres or in close packed structures with three-dimensional bonding between the hollow spheres, or in honeycomb-like structures with three-dimensional bonding. Vacuspheres can be used in a range of materials to reduce heat transfer. The thermal conductivities mentioned in particular examples presented herein are not intended to be limiting.

VacuBoards

VacuBoards are rigid and made from expanding seeds to hollow structures in a controlled volume, forming a honeycomb-like structure (or other lattice structure that fills the occupied volume). VacuBoards have thermal conductivities in the range of 0.005 to 0.030 W/m·K, or lower, depending on wall thickness and volume of the structure.

VacuBlankets

VacuBlankets are flexible and made with VacuSpheres and silicone rubber (or similar flexible material). The flexible material fills the interstices surrounding the close-packed VacuSpheres. In some cases, the VacuSpheres can be considered an additive. VacuBlankets have thermal conductivities in the range of 0.009 to 0.019 W/m·K, or lower, depending on wall thickness and volume of the VacuSpheres.

VacuPanels

VacuPanels are rigid and made with VacuSpheres in combination with an organic (or inorganic) with a low thermal conductivity. The low thermal conductivity material fills the interstices surrounding the close-packed VacuSpheres. Again, in some cases, the VacuSpheres can be considered an additive. VacuPanels have thermal conductivities in the range of 0.003 to 0.016 W/m·K, or lower, depending on wall thickness and volume of the VacuSpheres.

III. Graded Seals

Figure 13:
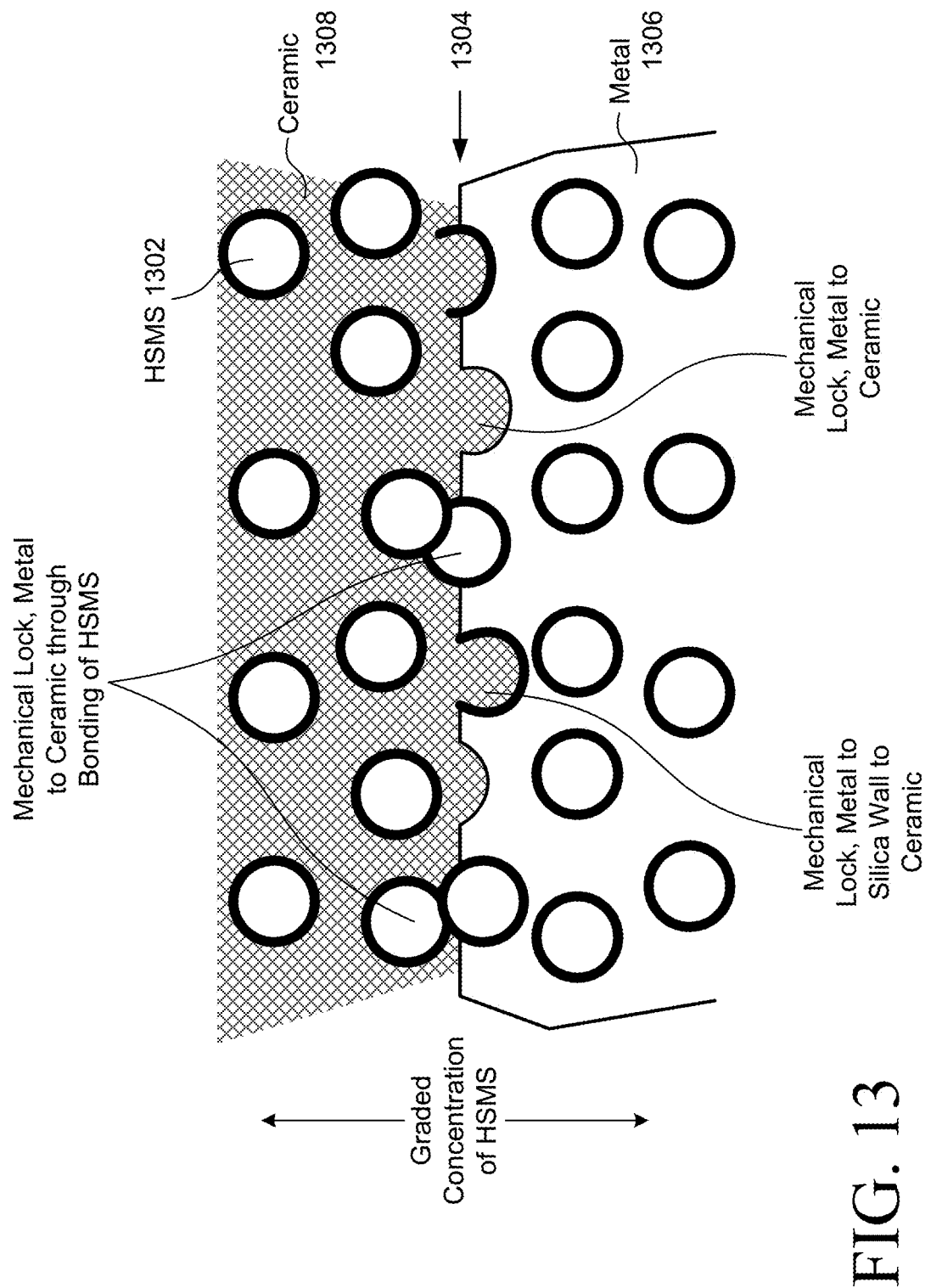
FIG. 13 illustrates how hollow spheres can be used to join materials having dissimilar coefficients of thermal expansion.

Hollow spheres can be used to enhance joining dissimilar materials. The joining of dissimilar materials involves matching thermal expansion coefficients. Ceramic to metal joining has largely been limited to attaching thin layers of enamel glass to a limited number of metal alloys with similar expansion coefficients. When materials with significant differences in thermal expansion coefficients are joined, there must be a graded interface. A graded interface is an interface where the thermal expansion coefficient is adjusted slightly, layer over layer, at the interface between the two materials. With hollow silica microspheres (HSMS) 1302, as presented in FIG. 13, a graded thermal expansion layer can be created by adjusting the concentration of HSMS 1302 at the interface 1304 where there is the highest concentration of the spheres in both materials (metal 1306 and ceramic 1308). Moving away from the interface the concentration of the HSMS 1302 is decreased. In FIG. 13 the top layer of the metal-hollow-silica-sphere composite is abraded, removing the tops of some of the hollow spheres in the metal matrix. At an elevated temperature, a ceramic layer with a high concentration of HSMS is added to the abraded surface.

HSMS is hollow silica microspheres. HSMS is used here as a non-limiting example. Its use is not intended to exclude hollow spheres of glass, or any other type of hollow spheres.

Joining of the two materials involves 3 types of mechanical locking as shown in FIG. 13: metal to ceramic, metal to silica wall to ceramic, and bonding between the spheres. The later requires heating the materials to an elevated temperature, a temperature that can be reduced by a small addition of a basic oxide, or silicate that promotes bonding between the spheres. The other mechanical locking mechanisms require the hollow spheres either being removed or opened as shown in FIG. 13.

IV. Hollow Spheres as Catalyst and as Fluidized Bed Stabilizer

Figure 14:
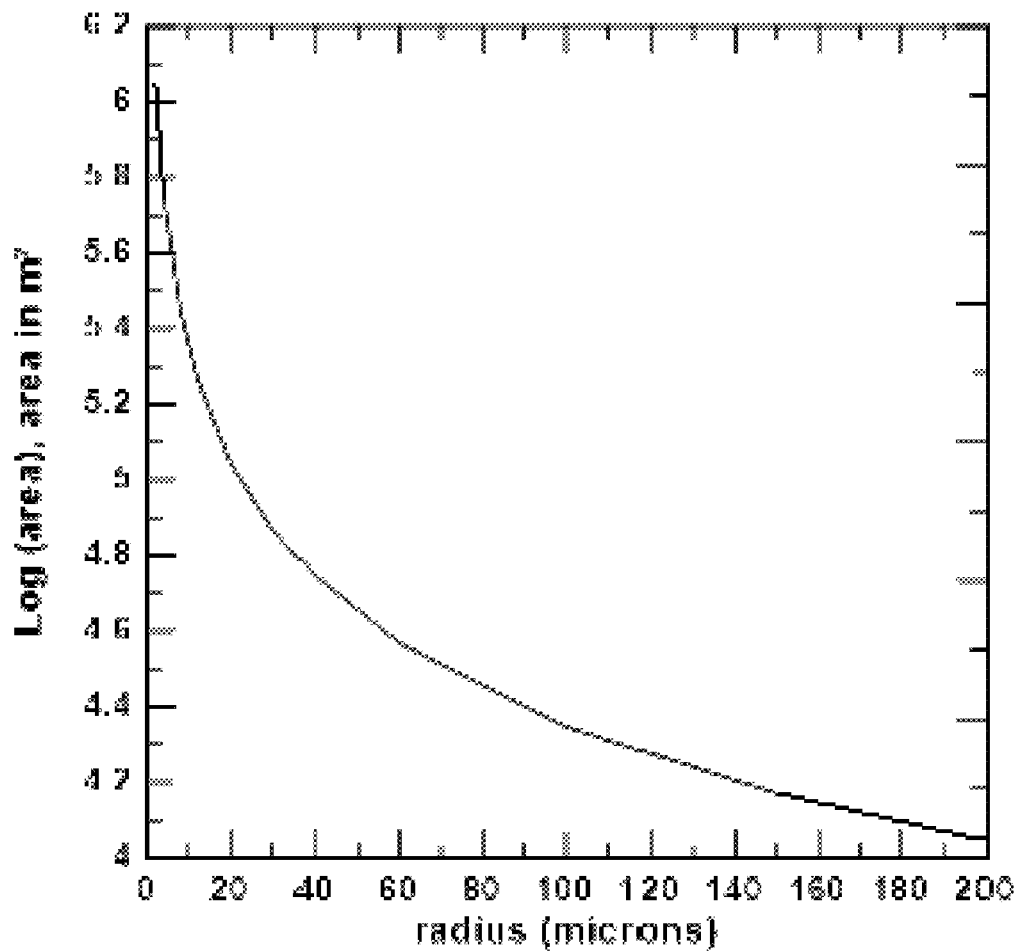
FIG. 14 is a graph showing the surface area of a cubic meter of hollow spheres as a function of the radius of the hollow spheres.

Hollow spheres can be coated with a catalyst after they are produced or have the catalyst embedded in the wall of the hollow sphere as described above. Hollow silica spheres can serve in that capacity at significantly higher temperatures than cenospheres. The surface area of a catalyst is an important issue in achieving desired yield for a chemical reaction with minimum reactor size and cost. The surface area of hollow spheres in a cubic meter is presented in FIG. 14. The use of the catalyst can be, for example, in either static or fluidized bed reactors. In the latter type of reactor, hollow spheres can serve more than just as catalyst support.

Figure 15:
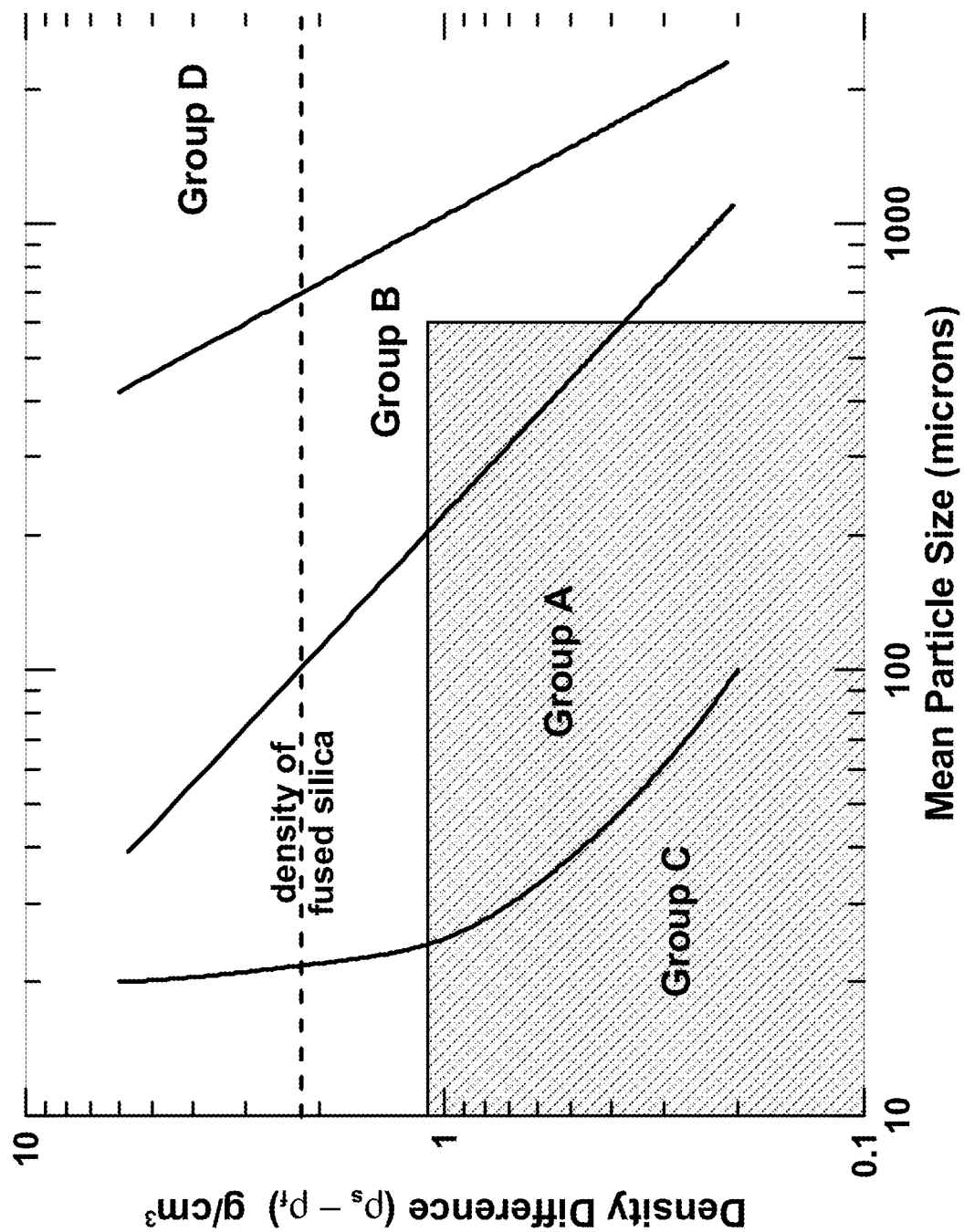
FIG. 15 is a Geldart's diagram characterizing the quality of fluidization of materials as a function of particle size and the difference in density of the solid ($\rho_s$) and of the fluid ($\rho_f$)

Hollow spheres can improve the performance of a fluidized bed reactor. FIG. 15, is a Geldart's diagram characterizing fluidization behavior with a gas. Geldart identified four distinct fluidized bed behaviors based on particle size and their density, a brief description of each follows:

Group A—Particles that fall into this group are characterized as having a small mean size and/or low density. These powders fluidize easily at low gas flow and experience-controlled bubbling at higher gas flows. The bed expands considerably with the onset of fluidization, and the reactor can be operated without bubbling.

Group B—Particles that fall into this group are characterized as having a larger mean size then that of Group A and/or low density. The primary difference in characterization is that these materials upon fluidization also create bubbles, and bed expansion is small.

Group C—Materials in this group are composed of powders of very small size. "Normal" fluidization of theses powders is considered extremely difficult because of their cohesive forces due to electrostatic forces developed due to unsatisfied bonding of surface atoms. Difficulty in fluidization is due to inter-particle forces between the particles being greater than forces being applied by the fluidizing gas.

Group D—Materials in this group either have a large mean particle size or are very dense. These materials are very hard to fluidize and form very large bubbles and channels that bring an end to fluidized bed behavior.

The optimum desired performance of a fluidized bed is where fluidization is easily achieved without bubble formation, namely Group A. That performance achieves the greatest contact between solids and the gas phase. Since the density of a gas at room temperature, and above, is orders of magnitude less than the smallest value for $\rho_s$-$\rho_f$ plotted on the ordinate in FIG. 15, $\rho_s$-$\rho_f$ is approximately equal to $\rho_s$. Thus, it is possible to add to Geldart's graph the density of fused silica, and the size and density range of hollow spheres formed from silica and glass. The latter is represented by the shaded area. That shaded area occupies a large portion of Group A, and thus hollow spheres can be designed for specific size and wall thickness to achieve optimum performance as a support for a catalyst involving gas phase reactions.

Figure 16:
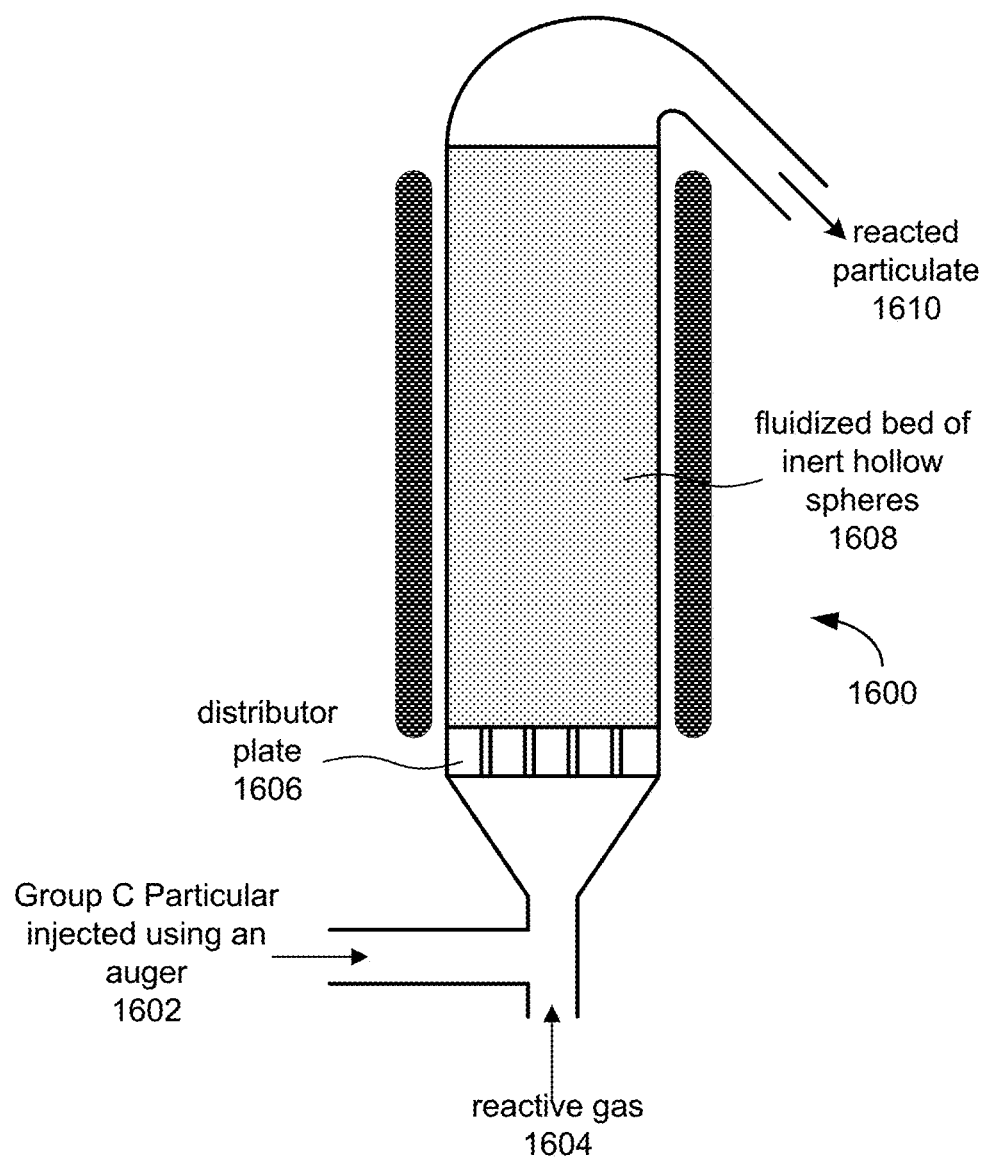
FIG. 16 shows a reactor for processing fine particulate.

Hollow spheres can also be used in processing materials in Group C, materials that resist fluidization, that are difficult to handle and pose a serious environmental problem as windblown fugitive emission. Group C materials are often a byproduct of crushing and grinding. The cost of processing Group C materials by existing methods often exceeds their return on investment. Disposal of Group C material can be expensive; prevention of both air and water contamination is essential. Gas-solid reactions with Group C materials can be improved using hollow spheres as an inert filler in a fluidized bed reactor 1600 as presented in FIG. 16. Group C particulate injected 1602, as shown in the figure, into a flowing gas 1604 of adequate velocity to disrupt the forces between those particles leading to their elutriation. The resulting dusty gas passes through the distributor plate 1606 into the fluidized bed reactor 1608. The inert hollow spheres are of Group A size and density, they serve as a medium for heat transfer, and have the kinetic energy at fluidization to keep particulate in the dusty gas from sticking together. As the dusty gas is heated the desired reaction takes place. The solid product 1610 rises through the fluidized bed 1608 and exits the reactor because of continued elutriation.

V. 3-Dimensional Printing with Hollow Spheres to Produce a Localized Property

Hollow spheres can be used in casting, 3-dimensional (3D) printing, and sintering of metals and ceramics to produce composites with designer properties; some of those properties are density, thermal conductivity, electrical conductivity, sound and electronic signal dissipation, crush strength, corrosion resistance, thermal expansion, etc. 3-D printing, in combination with localized heating, can be used to produce forms such as that presented in Example 4 entitled "Layered Sheets of Hollow Spheres."

The description of particular embodiments of the present invention is now complete. Many of the described features may be substituted, altered or omitted without departing from the scope of the invention. For example, alternate core compositions, coating compositions, and additives may be substituted for the materials used as examples herein. These and other deviations from the particular embodiments shown will be apparent to those skilled in the art, particularly in view of the foregoing disclosure.

I claim:

1. A method for producing a hollow sphere with a vacuum inside, said method comprising:
   providing a seed, said seed including a core and a coating outside said core, said core including a mixture of two or more compounds;
   heating said seed to a temperature sufficient to transform said coating into a continuous shell having an interior and an exterior, said continuous shell isolating said core from said exterior of said shell, said temperature also being sufficient to cause a reaction between said two or more compounds of said core, said reaction between said two or more compounds converting said core to a gas within said shell;
   controlling a rate of said heating and a pressure surrounding said exterior of said shell to allow said shell to expand responsive to a pressure of said gas within said shell;
   continuing to heat said seed until said reaction ceases to produce said gas;
   cooling said shell to a second temperature at which said shell becomes rigid; and
   continue to cooling said shell until said gases within said shell react with one another to revert to a solid form, thereby creating a vacuum within said rigid shell.

2. The method of claim 1, wherein said core includes at least one reducing agent in addition to said two or more compounds.

3. The method of claim 1, wherein said coating includes silica.

4. The method of claim 1, wherein said coating includes glass frit.

5. The method of claim 1, wherein said step of heating said seed includes heating said seed in conjunction with a plurality of similar seeds.

6. The method of claim 5, wherein said step of heating said seeds includes heating said seeds with a plasma torch.

7. The method of claim 5, wherein said step of heating said seeds includes:
   placing said plurality of seeds in a confined space in contact with one another, said confined space restricting expansion along at least one direction and allowing expansion along another direction different than said at least one direction; and
   heating said plurality of seeds within said confined space.

8. The method of claim 5, wherein said step of heating said seeds includes:
   placing said seeds in contact with previously formed hollow spheres;
   heating said seeds to transform said seeds into new hollow spheres in contact with said previously formed hollow spheres.

9. The method of claim 8, wherein said step of heating said seeds includes:
   restricting said heat source to predominantly heat said seeds; and
   allowing said seeds to expand unrestricted.

10. The method of claim 5, wherein said step of heating said seeds includes:
    depositing said seeds in layers on top of underlying layers of hollow spheres; and
    heating said layers of seeds without altering the underlying layers of hollow spheres.

11. The method of claim 1, wherein said step of providing said seed includes providing said seed with an additive to alter a physical property of the resulting hollow sphere.

12. The method of claim 11, wherein said step of providing said seed with an additive includes disposing said additive on an external surface of said coating.

13. The method of claim 11, wherein said step of providing said seed with an additive includes dispersing the additive within the coating.

14. The method of claim 11, wherein said step of providing said seed with an additive includes providing a layer of inert material between said core and said coating.

15. The method of claim 11, wherein said step of providing said seed with an additive includes mixing an inert material with said two or more compounds of said core.

* * * * *